US011003919B1

(12) United States Patent
Ghadiok et al.

(10) Patent No.: US 11,003,919 B1
(45) Date of Patent: May 11, 2021

(54) SYSTEMS AND METHODS FOR DETECTING TRAFFIC VIOLATIONS USING MOBILE DETECTION DEVICES

(71) Applicant: Hayden AI Technologies, Inc., Oakland, CA (US)

(72) Inventors: Vaibhav Ghadiok, Mountain View, CA (US); Christopher Carson, Oakland, CA (US); Bo Shen, Fremont, CA (US)

(73) Assignee: Hayden AI Technologies, Inc., Oakland, CA (US)

( * ) Notice: Subject to any disclaimer, the term of this patent is extended or adjusted under 35 U.S.C. 154(b) by 0 days.

(21) Appl. No.: 17/072,816

(22) Filed: Oct. 16, 2020

(51) Int. Cl.
| | | |
|---|---|---|
| *G06K 9/00* | (2006.01) | |
| *G06K 9/62* | (2006.01) | |
| *H04N 5/247* | (2006.01) | |
| *H04N 7/18* | (2006.01) | |
| *G01S 19/33* | (2010.01) | |
| *G01C 22/02* | (2006.01) | |
| *H04N 5/225* | (2006.01) | |
| *B60R 16/023* | (2006.01) | |
| *H04L 29/08* | (2006.01) | |

(52) U.S. Cl.
CPC ......... *G06K 9/00791* (2013.01); *G01C 22/02* (2013.01); *G01S 19/33* (2013.01); *G06K 9/6201* (2013.01); *G06K 9/6256* (2013.01); *G06K 9/6261* (2013.01); *H04N 5/2253* (2013.01); *H04N 5/247* (2013.01); *H04N 7/181* (2013.01); *B60R 16/023* (2013.01); *G06K 9/0063* (2013.01); *G06K 2209/15* (2013.01); *G06K 2209/23* (2013.01); *H04L 67/10* (2013.01)

(58) Field of Classification Search
None
See application file for complete search history.

(56) References Cited

U.S. PATENT DOCUMENTS

| | | |
|---|---|---|
| 7,489,257 B2 | 2/2009 | Izakov |
| 7,701,363 B1 | 4/2010 | Zlojutro |
| 7,986,339 B2 | 7/2011 | Higgins |
| 8,531,520 B2 | 9/2013 | Stricklin et al. |

(Continued)

FOREIGN PATENT DOCUMENTS

| | | |
|---|---|---|
| WO | WO 2019/043446 | 3/2019 |
| WO | WO 2019/045899 | 3/2019 |

(Continued)

*Primary Examiner* — James M Anderson, II
(74) *Attorney, Agent, or Firm* — Levine Bagade Han LLP

(57) ABSTRACT

Disclosed are systems and methods for detecting traffic violations using mobile detection devices. Videos captured by the mobile detection devices can be processed on the mobile detection devices to extract data and information concerning a potential traffic violation involving a vehicle and a restricted road area. The mobile detection devices can transmit such data and information to a server configured to make a final determination as to whether a traffic violation has occurred by comparing the data and information received from at least two mobile detection devices. The server can also construct semantic annotated maps using data and information received from the mobile detection devices. Updated versions of the semantic annotated maps can be transmitted back to the mobile detection devices to aid in traffic violation detection.

32 Claims, 11 Drawing Sheets

(56) References Cited

U.S. PATENT DOCUMENTS

| | | |
|---|---|---|
| 8,599,260 B1 | 12/2013 | Vaughn |
| 8,971,581 B2 | 3/2015 | Wu et al. |
| 9,019,380 B2 | 4/2015 | Schenken et al. |
| 9,104,939 B2 | 8/2015 | Seyfried et al. |
| 9,262,914 B2 | 2/2016 | Purushothaman |
| 9,389,147 B1 | 7/2016 | Lambert et al. |
| 9,443,152 B2 | 9/2016 | Atsmon et al. |
| 9,466,210 B2 | 10/2016 | Arpin et al. |
| 9,495,601 B2 | 11/2016 | Hansen |
| 9,524,269 B1 | 12/2016 | Brinkmann et al. |
| 9,552,724 B2 | 1/2017 | Rothschild |
| 9,679,203 B2 | 6/2017 | Bulan et al. |
| 9,704,060 B2 | 7/2017 | Wang et al. |
| 9,754,484 B2 | 9/2017 | Schenken |
| 9,934,627 B1 | 4/2018 | Brinkmann et al. |
| 9,984,566 B1 | 5/2018 | Mostofi et al. |
| 10,032,318 B1 | 7/2018 | Ferguson |
| 10,134,285 B1 | 11/2018 | Isler et al. |
| 10,147,004 B2 | 12/2018 | Atsmon et al. |
| 10,209,081 B2 | 2/2019 | Ghadiok et al. |
| 10,215,571 B2 | 2/2019 | Ghadiok et al. |
| 10,269,242 B2 | 4/2019 | Ahmad et al. |
| 10,296,794 B2 | 5/2019 | Ratti |
| 10,360,738 B1 | 7/2019 | Ferguson |
| 10,360,793 B1 | 7/2019 | Costantini et al. |
| 10,410,064 B2 | 9/2019 | Newman |
| 10,440,471 B2 | 10/2019 | Robbins et al. |
| 10,475,338 B1 | 11/2019 | Noel |
| 10,504,304 B1 | 12/2019 | Ferguson |
| 10,553,109 B2 | 2/2020 | Burley et al. |
| 10,580,294 B2 | 3/2020 | Bedard |
| 10,643,467 B2 | 5/2020 | Alon |
| 10,664,707 B2 | 5/2020 | Hannah |
| 10,713,490 B2 | 7/2020 | Edmondson et al. |
| 10,755,111 B2 | 8/2020 | Golov et al. |
| 10,755,565 B2 | 8/2020 | Zhang et al. |
| 10,814,815 B1* | 10/2020 | Rishi ..................... B60R 21/013 |
| 2014/0036076 A1* | 2/2014 | Nerayoff ............ G06K 9/00791 |
| | | 348/148 |
| 2018/0025636 A1 | 1/2018 | Boykin et al. |
| 2018/0134282 A1 | 5/2018 | Freienstein et al. |
| 2018/0137754 A1 | 5/2018 | Alon |
| 2018/0350229 A1 | 12/2018 | Yigit et al. |
| 2019/0066517 A1 | 2/2019 | Neser |
| 2019/0137280 A1 | 5/2019 | Ghadiok et al. |
| 2019/0197889 A1 | 6/2019 | Kanehara et al. |
| 2019/0206254 A1 | 7/2019 | Tao et al. |
| 2019/0220011 A1 | 7/2019 | Della Penna |
| 2019/0304297 A1 | 10/2019 | Burley et al. |
| 2020/0043326 A1 | 2/2020 | Tao et al. |
| 2020/0081134 A1* | 3/2020 | Wheeler ............... G01S 19/393 |
| 2020/0105135 A1 | 4/2020 | Noel |
| 2020/0117928 A1 | 4/2020 | Nishimura |
| 2020/0130711 A1 | 4/2020 | Turek et al. |
| 2020/0137580 A1 | 4/2020 | Yang et al. |
| 2020/0216064 A1 | 7/2020 | Du Toit et al. |
| 2020/0250970 A1 | 8/2020 | Takeshita et al. |
| 2020/0257306 A1* | 8/2020 | Nisenzon ........... G06K 9/00791 |
| 2020/0265713 A1 | 8/2020 | Abeling et al. |
| 2020/0265714 A1 | 8/2020 | Alon |
| 2020/0280842 A1 | 9/2020 | Liu et al. |

FOREIGN PATENT DOCUMENTS

| | | |
|---|---|---|
| WO | WO 2019/143723 | 7/2019 |
| WO | WO 2020/046218 | 3/2020 |
| WO | WO 2020/068923 | 4/2020 |
| WO | WO 2020/121627 | 6/2020 |
| WO | WO 2020/146445 | 7/2020 |

\* cited by examiner

CARRIER VEHICLE 110

MUNICIPAL FLEET VEHICLE

SEMI-AUTONOMOUS VEHICLE

AUTONOMOUS VEHICLE

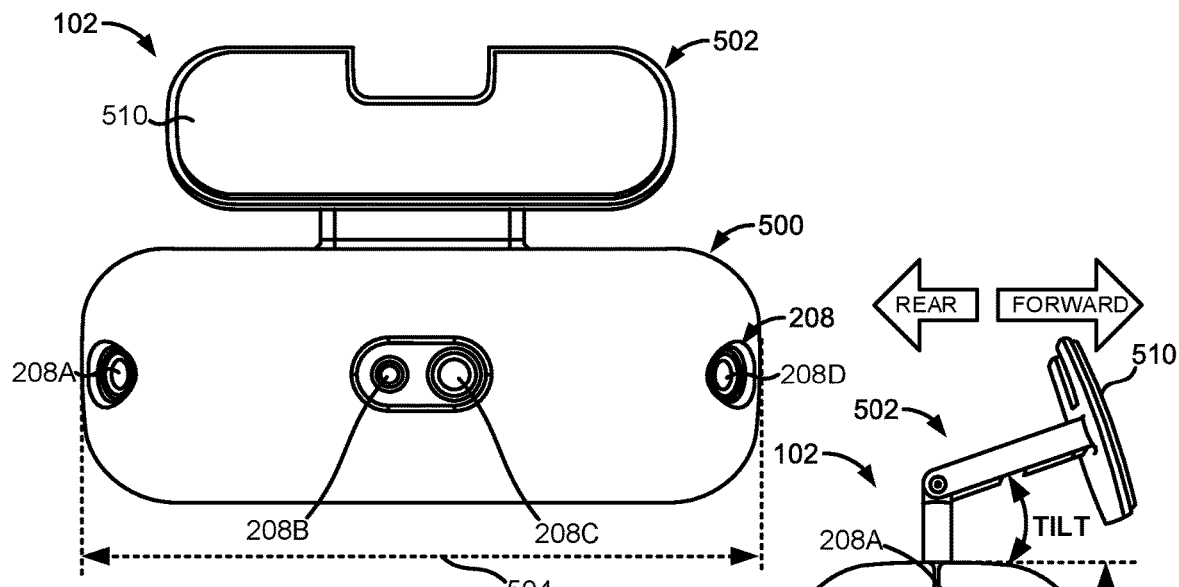
FIG. 5A
FIG. 5B
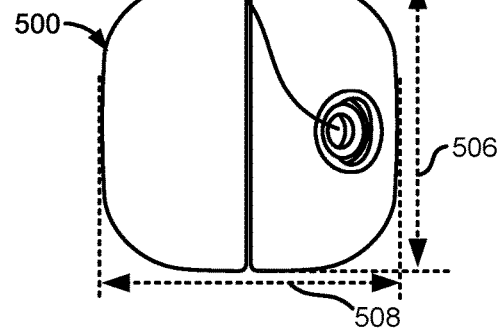
FIG. 5C
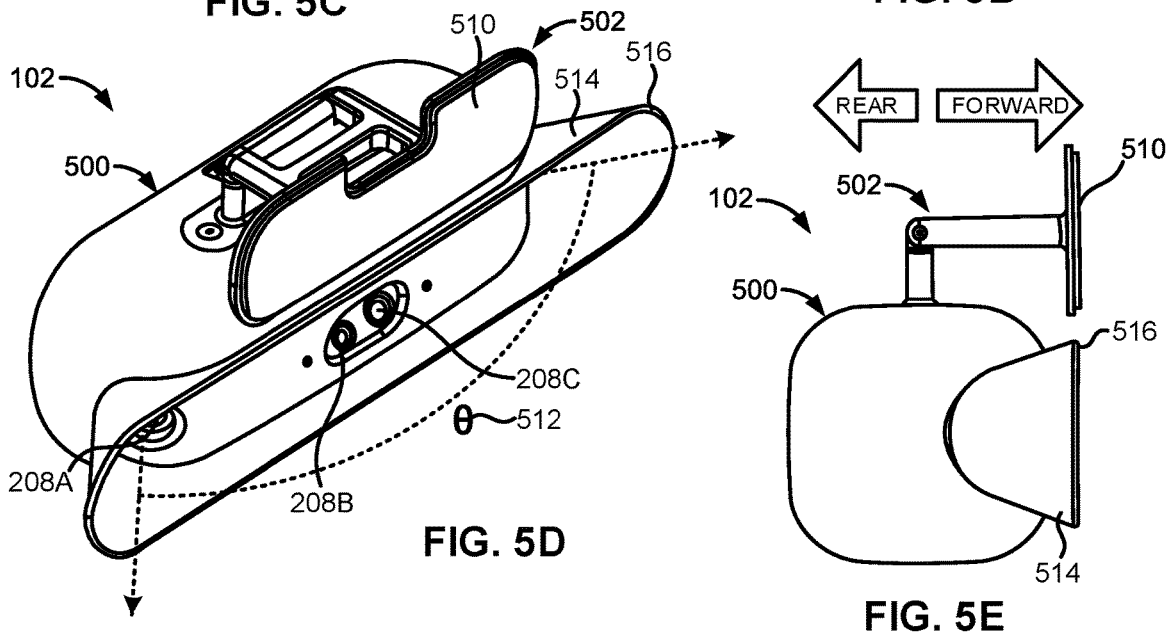
FIG. 5D
FIG. 5E

SYSTEMS AND METHODS FOR DETECTING TRAFFIC VIOLATIONS USING MOBILE DETECTION DEVICES

TECHNICAL FIELD

This disclosure relates generally to the field of computer-based traffic violation detection, more specifically, to systems and methods for detecting traffic violations using mobile detection devices.

BACKGROUND

Non-public vehicles parking in bus lanes or bike lanes is a significant transportation problem for municipalities, counties, and other government entities. While some cities have put in place Clear Lane Initiatives aimed at improving bus speeds, enforcement of bus lane violations is often lacking and the reliability of multiple buses can be affected by just one vehicle illegally parked or temporarily stopped in a bus lane. Such disruptions in bus schedules can frustrate those that depend on public transportation and result in decreased ridership. On the contrary, as buses speed up due to bus lanes remaining unobstructed, reliability improves, leading to increased ridership, less congestion on city streets, and less pollution overall.

Similarly, vehicles parked illegally in bike lanes can force bicyclists to ride on the road, making their rides more dangerous and discouraging the use of bicycles as a safe and reliable mode of transportation. Moreover, vehicles parked along curbs or lanes designated as no parking zones or during times when parking is forbidden can disrupt crucial municipal services such as street sweeping, waste collection, and firefighting operations.

Traditional traffic enforcement technology and approaches are often not suited for lane enforcement purposes. For example, most traffic enforcement cameras are set up near crosswalks or intersections and are not suitable for enforcing lane violations beyond the cameras' fixed field of view. While some municipalities have deployed automated camera-based solutions to enforce traffic violations beyond intersections and cross-walks, such solutions are often logic-based and can result in detections with up to 80% false positive detection rate. Moreover, municipalities often do not have the financial means to dedicate specialized personnel to enforce lane violations.

Therefore, an improved traffic violation detection system is needed which addresses the challenges faced by traditional traffic violation detection systems and approaches. Such a solution should be accurate and use resources currently available to a municipality or other government entity. Moreover, such a solution should improve traffic safety and enable transportation efficiency. Furthermore, such a solution should be scalable and reliable and not be overly expensive to deploy.

SUMMARY

Disclosed are systems and methods for detecting traffic violations using mobile detection devices. In some embodiments, a method of detecting a traffic violation can comprise capturing a first video of a vehicle and a restricted road area using one or more video image sensors of a first edge device. The first video can comprise a first frame captured at a first point in time. The method can also comprise determining a location of the vehicle using, in part, a first positioning data obtained from a first positioning unit of the first edge device. The method can also comprise identifying, using one or more processors of the first edge device, the vehicle, a first set of vehicle attributes of the vehicle, a first alphanumeric string representing a license plate number of the vehicle, and the restricted road area from frames of the first video by applying functions from a computer vision library to frames of the first video and passing at least some the first video including the first frame to a deep learning model running on the first edge device. The method can further comprise bounding the vehicle and the restricted road area in the first frame in a plurality of first bounding boxes and detecting a first potential traffic violation at the first point in time based in part on overlap of the first bounding boxes. The method can further comprise generating or recording a first timestamp to reflect the first point in time. The method can also comprise transmitting the first alphanumeric string, the first set of vehicle attributes, the first positioning data, the first timestamp, and a segment of the first video around the first point in time from the first edge device to the server. In some embodiments, the segment of the first video transmitted from the first edge device to the server can be configurable such that the duration of the video transmitted can be adjusted by a system operator or administrator (e.g., the video segment transmitted can include 15 to 30 seconds of the video before the first point in time and 15 to 30 seconds of the video after the first point in time).

The method can further comprise capturing a second video of the vehicle and the restricted road area using one or more video image sensors of a second edge device. The second video can comprise a second frame captured at a second point in time. The method can also comprise determining a location of the vehicle using, in part, a second positioning data obtained from a second positioning unit of the second edge device. The method can also comprise identifying, using one or more processors of the second edge device, the vehicle, a second set of vehicle attributes of the vehicle, a second alphanumeric string representing a license plate number of the vehicle, and the restricted road area from frames of the second video by applying a plurality of functions from a computer vision library to the second video and passing at least some of the second video including the second frame to a deep learning model running on the second edge device.

The method can also comprise bounding the vehicle and the restricted road area in the second frame in a plurality of second bounding boxes and detecting a second potential traffic violation at a second point in time based in part on overlap of the second bounding boxes. The method can further comprise generating or recording a second timestamp to reflect the second point in time. The method can further comprise transmitting at least the second alphanumeric string, the second set of vehicle attributes, the second positioning data, the second timestamp, and a segment of the second video around the second point in time from the second edge device to the server. In some embodiments, the segment of the second video transmitted from the second edge device to the server can be configurable such that the duration of the video transmitted can be adjusted by a system operator or administrator (e.g., the video segment transmitted can include 15 to 30 seconds of the video before the second point in time and 15 to 30 seconds of the video after the second point in time).

The method can also comprise determining, at the server, that a traffic violation has occurred based on an elapsed time between the second point in time and the first point in time and based on a comparison of the first alphanumeric string with the second alphanumeric string, the first set of vehicle attributes with the second set of vehicle attributes, and the first positioning data with the second positioning data.

In some embodiments, the deep learning model can comprise or be a convolutional neural network trained for object detection. The deep learning model can be trained in part from videos captured using edge devices other than the first edge device and the second edge device.

In certain embodiments, the first positioning unit can be a multi-band global navigation satellite system (GNSS) receiver configured for concurrent reception of signals from at least two of a GPS satellite navigation system, a GLONASS satellite navigation system, a Galileo navigation system, and a BeiDou satellite navigation system.

The steps of bounding the vehicle and the restricted road area can further comprise bounding the vehicle using a vehicular bounding box and bounding the restricted road area using a road bounding box. The steps of determining the first potential traffic violation and the second potential traffic violation can further comprise detecting any overlaps between the vehicular bounding box and the road bounding box.

The steps of capturing the videos can further comprise capturing the first video and the second video at a frame rate of between 1 frame per second (FPS) and 120 frames per second (FPS). In other embodiments, the steps of capturing the videos can further comprise capturing the first video and the second video at between 20 FPS and 80 FPS.

In some embodiments, at least some of the video image sensors of each of the edge devices can be high-dynamic range (HDR) image sensors. Moreover, at least one of the video image sensors of each of the edge devices can be a fixed-focal or varifocal license plate recognition (LPR) camera. In these embodiments, the method can further comprise passing a video frame captured by the LPR camera to a license plate recognition engine running on each of the edge devices to identify the alphanumeric string representing the license plate number of the vehicle.

In other embodiments, the license plate recognition engine can be run on the server. In further embodiments, the license plate recognition engine can be run on each of the edge devices and on the server.

Alternatively, the method can also comprise passing a video frame captured by an HDR image sensor to the license plate recognition engine running on each of the edge devices, the server, or a combination thereof.

The first edge device can be configured to be coupled to a first carrier vehicle and the second edge device can be configured to be coupled to a second carrier vehicle. The first edge device can comprise a first vehicle bus connector for obtaining wheel odometry data from a wheel odometer of the first carrier vehicle. The second edge device can comprise a second vehicle bus connector for obtaining wheel odometry data from a wheel odometer of the second carrier vehicle. In some embodiments, the steps of determining the location of the vehicle can further comprise using in part the wheel odometry data from the first carrier vehicle and the second carrier vehicle.

The method can further comprise generating, using the one or more server processors, a simulation of the traffic violation using a reasoning engine running on the server by utilizing a game engine based on data and video frames obtained from the first video and the second video. The server can then use the simulation to determine whether any mitigating events occurring in a vicinity of the vehicle should preclude the potential traffic violation from being considered a traffic violation.

The method can also comprise generating, using the one or more server processors, a graphical user interface (GUI) to be displayed on a client device communicatively coupled to the server. In some embodiments, the GUI can comprise a video clip made from at least one of the first video and the second video, the location of the vehicle determined by at least one of the first edge device and the second edge device, and a portion of a map showing the location.

In some embodiments, each of the edge devices can comprise an attachment arm configured to secure the edge device to a window or dashboard of a carrier vehicle. In other embodiments, each of the edge devices can comprise an attachment arm configured to secure the edge device to a handle bar/handrail of a micro-mobility vehicle serving as the carrier vehicle. In further embodiments, each of the edge devices can comprise an attachment arm configured to secure the edge device to a mount or body of an unmanned aerial vehicle (UAV) or drone serving as the carrier vehicle.

In another embodiment, a system for detecting a traffic violation is disclosed. The system can comprise a first edge device, a second edge device, and a server in communication with the first edge device and the second edge device. The first edge device can comprise one or more first edge device processors, one or more first video image sensors, and a first positioning unit.

The first video image sensors can be configured to capture a first video of a vehicle and a restricted road area. The first video can comprise a first frame captured at a first point in time. The one or more first edge device processors can be programmed to determine a location of the vehicle using in part a first positioning data obtained from the first positioning unit and identify the vehicle, the restricted road area, a first set of vehicle attributes of the vehicle, and a first alphanumeric string representing a license plate number of the vehicle from frames of the first video by applying a plurality of functions from a computer vision library to the first video and passing at least some of the first video including the first frame to a deep learning model running on the first edge device.

The one or more first edge device processors can also be programmed to bound the vehicle and the restricted road area in the first frame in a plurality of first bounding boxes and detect a first potential traffic violation at the first point in time based in part on overlap of the plurality of first bounding boxes. The one or more first edge device processors can also be programmed to generate or record a first timestamp to reflect the first point in time. The one or more first edge device processors can also be programmed to transmit the first alphanumeric string, the first set of vehicle attributes, the first positioning data, the first timestamp, and a configurable segment of the first video around the first point in time from the first edge device to the server.

The system can also comprise a second edge device comprising one or more second edge device processors, one or more second video image sensors, and a second positioning unit. The second video image sensors can be configured to capture a second video of the vehicle and the restricted road area. The second video can comprise a second frame captured at a second point in time.

The one or more second edge device processors can be programmed to determine the location of the vehicle using in part a second positioning data obtained from the second positioning unit and identify the vehicle, the restricted road area, a second set of vehicle attributes of the vehicle, and a second alphanumeric string representing the license plate number of the vehicle from frames of the second video by applying a plurality of functions from a computer vision library to the second video and passing at least some of the second video including the second frame to a deep learning model running on the second edge device. The deep learning model running on the second edge device can be the same as the deep learning model running on the first edge device.

The one or more second edge device processors can also be programmed to bound the vehicle and the restricted road area in the second frame in a plurality of second bounding boxes and detect a second potential traffic violation at the second point in time based in part on overlap of the plurality of second bounding boxes. The one or more second edge device processors can also be programmed to generate or record a second timestamp to reflect the second point in time. The one or more second edge device processors can also be programmed to transmit the second alphanumeric string, the second set of vehicle attributes, the second positioning data, the second timestamp, and a configurable segment of the second video around the second point in time from the second edge device to the server.

The server can comprise one or more server processors programmed to determine that a traffic violation has occurred based on an elapsed time between the second point in time and the first point in time and a comparison of the first alphanumeric string with the second alphanumeric string, the first set of vehicle attributes with the second set of vehicle attributes, and the first positioning data with the second positioning data.

In some embodiments, the deep learning model can be or comprise a convolutional neural network trained for object detection. The deep learning model can be trained in part from videos captured using edge devices other than the first edge device and the second edge device.

In certain embodiments, the first positioning unit can be a multi-band global navigation satellite system (GNSS) receiver configured for concurrent reception of signals from at least two of a GPS satellite navigation system, a GLONASS satellite navigation system, a Galileo navigation system, and a BeiDou satellite navigation system.

The one or more first edge device processors can further be programmed to bound the vehicle in the first frame using a first vehicular bounding box, bound the restricted road area in the first frame using a first road bounding box, and detect the first potential traffic violation by detecting any overlap between the first vehicular bounding box with the first road bounding box.

The one or more second edge device processors can further be programmed to bound the vehicle in the second frame using a second vehicular bounding box, bound the restricted road area in the second frame using a second road bounding box, and detect the second potential traffic violation by detecting any overlap between the second vehicular bounding box with the second road bounding box.

In some embodiments, at least one of the video image sensors of each of the edge devices can be a varifocal or fixed-focal LPR camera. In these embodiments, the video frame captured by the LPR camera can be passed to a license plate recognition engine running on each of the edge devices, the server, or a combination thereof to identify an alphanumeric string representing the license plate number of the vehicle.

In some embodiments, at least some of the video image sensors of each of the edge devices can be HDR image sensors. In these embodiments, the first video and the second video can be captured at a frame rate of between 1 frame per second to 120 FPS. In further embodiments, the first video and the second video can be captured at a frame rate of between 20 FPS and 80 FPS.

In other embodiments, a video frame captured by one of the HDR image sensors can be passed to the license plate recognition engine running on the edge device, the server, or a combination thereof.

The first edge device can be configured to be coupled to a first carrier vehicle or device and the second edge device can be configured to be coupled to a second carrier vehicle or device. The first edge device can comprise a first vehicle bus connector for obtaining wheel odometry data from a wheel odometer of the first carrier vehicle. The second edge device can comprise a second vehicle bus connector for obtaining wheel odometry data from a wheel odometer of the second carrier vehicle. In some embodiments, the location of the vehicle can be determined in part from the wheel odometry data of the first carrier vehicle and the wheel odometry data of the second carrier vehicle.

The server can further comprise a reasoning engine configured to generate a simulation of the traffic violation utilizing a game engine based on data and video frames obtained from the first video and the second video. The reasoning engine of the server can then use the simulation to determine whether any mitigating events occurring in a vicinity of the vehicle should preclude the potential traffic violation from being considered a traffic violation.

The one or more server processors can be further programmed to generate a GUI to be displayed on a client device communicatively coupled to the server. The GUI can comprise a video clip made from at least one of the first video and the second video, the location of the vehicle determined by at least one of the first edge device and the second edge device, and a portion of a map showing the location.

A device for detecting a potential traffic violation is also disclosed. The device can comprise one or more video image sensors configured to capture a video of a vehicle and a restricted road area and a positioning unit configured to determine a location of the vehicle. The device can also comprise one or more processors programmed to execute instructions to identify the vehicle and the restricted road area from frames of the video by applying a plurality of functions from a computer vision library to the frames and passing the frames to a deep learning model running on the device. The one or more processors can also be programmed to bound the vehicle in the frames with a vehicular bounding box and bound the restricted road area in the frames with a road bounding box. The one or more processors can further be programmed to detect that a potential traffic violation has occurred based in part on the location of the vehicle and any overlap between the vehicular bounding box and the road bounding box.

A method for detecting a potential traffic violation is also disclosed. The method can comprise capturing a video of a vehicle and a restricted road area using one or more video image sensors of the device and determining a location of the vehicle using, in part, a positioning data obtained from a positioning unit of the device. The method can also comprise identifying, using one or more processors of the device, the vehicle and the restricted road area from frames of the video by applying a plurality of functions from a computer vision library to the frames and passing the frames to a deep learning model running on the device. The method can further comprise bounding the vehicle in the frames with a vehicular bounding box and bounding the restricted road area in the frames with a road bounding box. The method can also comprise detecting that a potential traffic violation has occurred based in part on the location of the vehicle and any overlap between the vehicular bounding box and the road bounding box.

BRIEF DESCRIPTION OF THE DRAWINGS

FIG. 5A illustrates a front view of one embodiment of an edge device.

FIG. 5B illustrates a right side view of the embodiment of the edge device shown in FIG. 5A.

FIG. 5C illustrates a combined field of view of cameras housed within the embodiment of the edge device shown in FIG. 5A.

FIG. 5D illustrates a perspective view of another embodiment of the edge device having a camera skirt.

FIG. 5E illustrates a right side view of the embodiment of the edge device shown in FIG. 5D.

DETAILED DESCRIPTION OF THE INVENTION

Figure 1A:
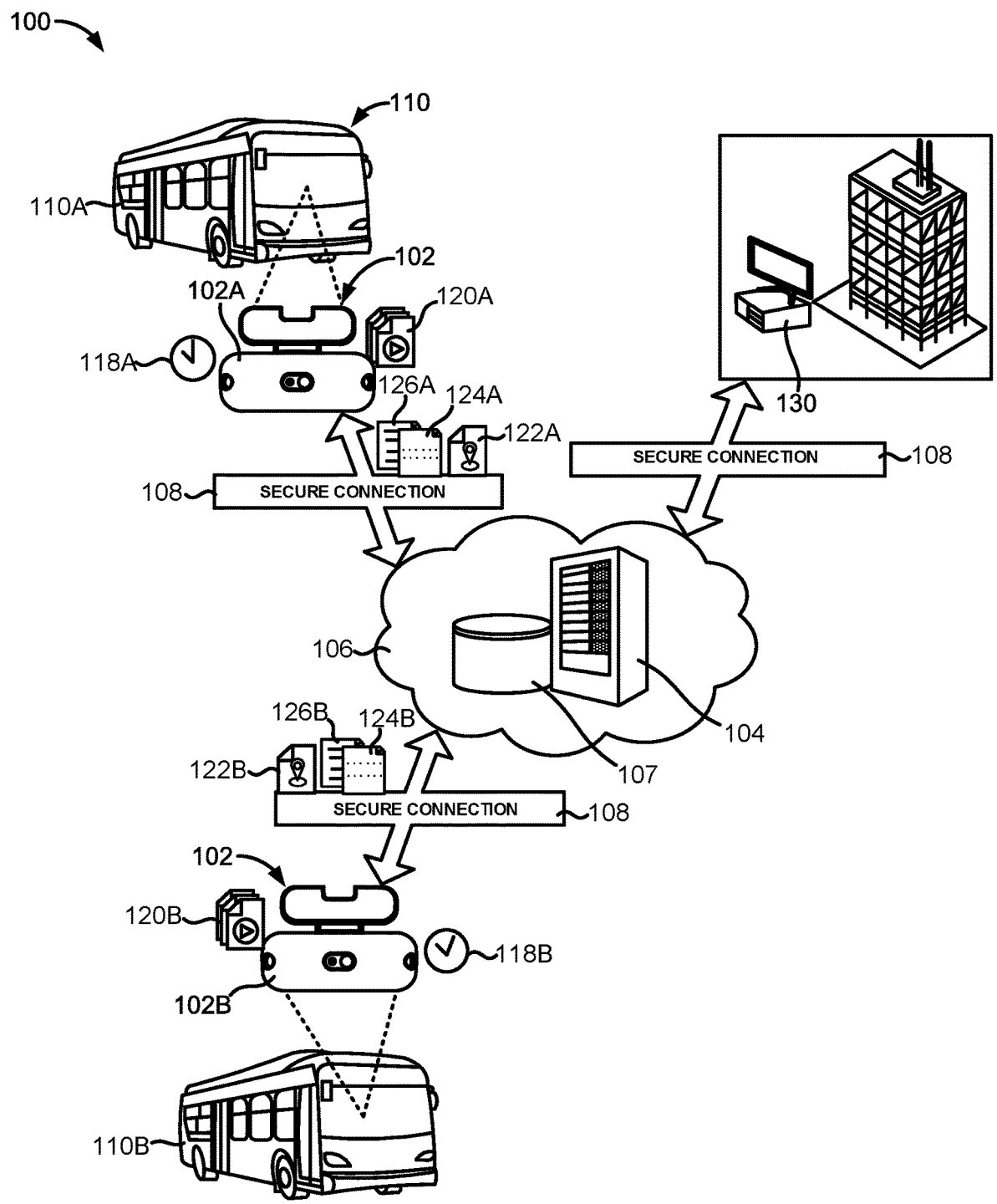
FIG. 1A illustrates one embodiment of a system for detecting traffic violations.

FIG. 1A illustrates one embodiment of a system 100 for detecting traffic violations using a multi-device corroborative approach. The system 100 can comprise a plurality of edge devices 102 communicatively coupled to or in wireless communication with a server 104 in a cloud computing environment 106.

The server 104 can comprise or refer to one or more virtual servers or virtualized computing resources. For example, the server 104 can refer to a virtual server or cloud server hosted and delivered by a cloud computing platform (e.g., Amazon Web Services®, Microsoft Azure®, or Google Cloud®). In other embodiments, the server 104 can refer to one or more stand-alone servers such as a rack-mounted server, a blade server, a mainframe, a dedicated desktop or laptop computer, one or more processors or processors cores therein, or a combination thereof.

The edge devices 102 can communicate with the server 104 over one or more networks. In some embodiments, the networks can refer to one or more wide area networks (WANs) such as the Internet or other smaller WANs, wireless local area networks (WLANs), local area networks (LANs), wireless personal area networks (WPANs), system-area networks (SANs), metropolitan area networks (MANs), campus area networks (CANs), enterprise private networks (EPNs), virtual private networks (VPNs), multi-hop networks, or a combination thereof. The server 104 and the plurality of edge devices 102 can connect to the network using any number of wired connections (e.g., Ethernet, fiber optic cables, etc.), wireless connections established using a wireless communication protocol or standard such as a 3G wireless communication standard, a 4G wireless communication standard, a 5G wireless communication standard, a long-term evolution (LTE) wireless communication standard, a Bluetooth™ (IEEE 802.15.1) or Bluetooth™ Lower Energy (BLE) short-range communication protocol, a wireless fidelity (WiFi) (IEEE 802.11) communication protocol, an ultra-wideband (UWB) (IEEE 802.15.3) communication protocol, a ZigBee™ (IEEE 802.15.4) communication protocol, or a combination thereof.

The edge devices 102 can transmit data and files to the server 104 and receive data and files from the server 104 via secure connections 108. The secure connections 108 can be real-time bidirectional connections secured using one or more encryption protocols such as a secure sockets layer (SSL) protocol, a transport layer security (TLS) protocol, or a combination thereof. Additionally, data or packets transmitted over the secure connection 108 can be encrypted using a Secure Hash Algorithm (SHA) or another suitable encryption algorithm. Data or packets transmitted over the secure connection 108 can also be encrypted using an Advanced Encryption Standard (AES) cipher.

The server 104 can store data and files received from the edge devices 102 in one or more databases 107 in the cloud computing environment 106. In some embodiments, the database 107 can be a relational database such as a PostgreSQL-compatible database. In further embodiments, the database 107 can be a column-oriented or key-value database. In certain embodiments, the database 107 can be stored in a server memory or storage unit 220. In other embodiments, the database 107 can be distributed among multiple storage nodes.

As will be discussed in more detail in the following sections, each of the edge devices 102 can be carried by or installed in a carrier vehicle 110 (see FIG. 4 for examples of different types of carrier vehicles 110).

For example, the edge device 102 can be secured or otherwise coupled to a windshield, window, or dashboard/deck of the carrier vehicle 110. Also, for example, the edge device 102 can be secured or otherwise coupled to a handlebar/handrail of a micro-mobility vehicle serving as the carrier vehicle 110. Alternatively, the edge device 102 can be secured or otherwise coupled to a mount or body of a UAV or drone serving as the carrier vehicle 110.

When properly coupled or secured to the windshield, window, or dashboard/deck of the carrier vehicle 110 or secured to a handrail, handlebar, or mount/body of the carrier vehicle 110, the edge device 102 can use its video image sensors 208 (see, e.g., FIG. 5A-5E) to capture videos of a potential traffic violation. Each of the edge devices 102 can then process and analyze video frames from such videos using certain computer vision tools from a computer vision library and deep learning models to detect whether a potential traffic violation has occurred. If the edge device 102 determines that a potential traffic violation has occurred, the edge device 102 can transmit data and files to the server 104.

The server 104 can make a final determination concerning the potential traffic violation based on data and files received from at least two edge devices 102 concerning the same potential traffic violation. As such, the approach taken by the system 100 is a multi-device corroborative approach for detecting traffic violations.

Figure 1B:
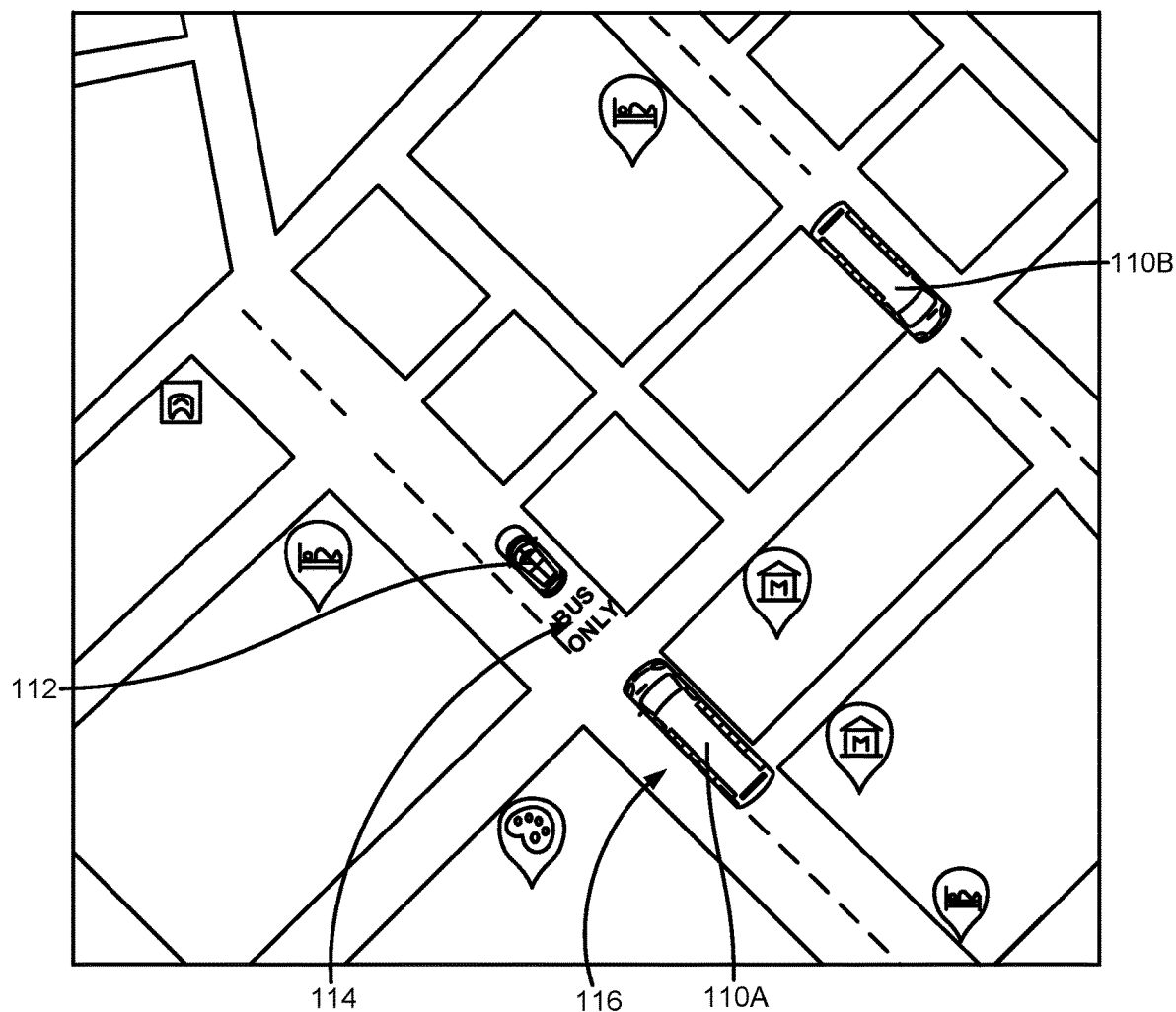
FIG. 1B illustrates a scenario where the system of FIG. 1A can be utilized to detect a traffic violation.

FIG. 1B illustrates a scenario where the system 100 of FIG. 1A can be utilized to detect a traffic violation. As shown in FIG. 1B, a vehicle 112 can be parked or otherwise stopped in a restricted road area 114. The restricted road area 114 can be a bus lane, a bike lane, a no parking or no stopping zone (e.g., a no-parking zone in front of a red curb or fire hydrant), a pedestrian crosswalk, or a combination thereof. In other embodiments, the restricted road area 114 can be a restricted parking spot where the vehicle 112 does not have the necessary credentials or authorizations to park in the parking spot. The restricted road area 114 can be marked by certain insignia, text, nearby signage, road or curb coloration, or a combination thereof. In other embodiments, the restricted road area 114 can be designated or indicated in a private or public database (e.g., a municipal GIS database) accessible by the edge device 102, the server 104, or a combination thereof.

As shown in FIG. 1B, a first carrier vehicle 110A having a first edge device 102A (see, e.g., FIG. 1A) installed within the first carrier vehicle 110A or otherwise coupled to the first carrier vehicle 110A can drive by (i.e., next to) or behind the vehicle 112 parked or stopped in the restricted road area 114. For example, the first carrier vehicle 110A can be driving in a lane or other roadway blocked by the vehicle 112. Alternatively, the first carrier vehicle 110A can be driving in an adjacent roadway 116 such as a lane next to the restricted road area 114. The first carrier vehicle 110A can encounter the vehicle 112 while traversing its daily route (e.g., bus route, garbage collection route, etc.).

As shown in FIG. 1A, the first edge device 102A can capture a first video 120A of the vehicle 112 and at least part of the restricted road area 114 using one or more video image sensors 208 (see, e.g., FIGS. 5A-5E) of the first edge device 102A.

The first video 120A can comprise a first frame captured at a first point in time. The one or more processors of the first edge device 102A can be programmed to generate or record a first timestamp 118A reflecting the first point in time.

In one embodiment, the first video 120A can be a video in the MPEG-4 Part 12 or MP4 file format.

In some embodiments, the first video 120A can refer to one of the multiple videos captured by the various video image sensors 208. In other embodiments, the first video 120A can refer to one compiled video comprising multiple videos captured by the video image sensors 208. In further embodiments, the first video 120A can refer to all of the videos captured by all of the video image sensors 208.

The first edge device 102A can then determine a location of the vehicle 112 using, in part, a first positioning data 122A obtained from a first positioning unit (see, e.g., FIG. 2A) of the first edge device 102A. The first edge device 102A can also determine the location of the vehicle 112 using, in part, inertial measurement data obtained from a first IMU (see, e.g., FIG. 2A) and wheel odometry data 216 (see, FIG. 2A) obtained from a wheel odometer of the first carrier vehicle 110A.

One or more processors of the first edge device 102A can be programmed to automatically identify objects from the first video 120A by applying a plurality of functions from a computer vision library 312 (see, e.g., FIG. 3) to the first video 120A to, among other things, read video frames from the first video 120A and passing at least some of the video frames from the first video 120A, including the first frame, to a deep learning model 314 (see, e.g., FIG. 3) running on the first edge device 102A. For example, the vehicle 112 and the restricted road area 114 can be identified as part of this object detection step. The computer vision library and the deep learning model will be discussed in more detail in later sections.

The one or more processors of the first edge device 102A can also pass at least some of the first video 120A to the deep learning model 314 to identify a first set of vehicle attributes 126A of the vehicle 112. The first set of vehicle attributes 126A can include a color of the vehicle 112, a make and model of the vehicle 112, and a vehicle type (e.g., a personal vehicle or a public service vehicle such as a fire truck, ambulance, parking enforcement vehicle, police car, etc.) identified by the first edge device 102A.

As will be discussed in more detail in later sections, the one or more processors of the first edge device 102A can also be programmed to bound the vehicle 112 and the restricted road area 114 in frames of the first video 120A in a plurality of first bounding boxes or lines (see, e.g., FIG. 9).

At least one of the video image sensors 208 of the first edge device 102A can be a dedicated license plate recognition (LPR) camera. The first video 120A can comprise at least one video frame or image showing a license plate of the vehicle 112. The first edge device 102A can pass the video frame captured by the LPR camera to a license plate recognition engine 304 running on the first edge device 102A (see, e.g., FIG. 3) to recognize a first alphanumeric string 124A representing a license plate of the vehicle 112.

In other embodiments not shown in the figures, the license plate recognition engine 304 can be run on the server 104. In further embodiments, the license plate recognition engine 304 can be run on the first edge device 102A and the server 104.

Alternatively, the first edge device 102A can pass a video frame captured by one of the other video image sensors 208 (e.g., one of the HDR cameras) to the license plate recognition engine 304 run on the first edge device 102A, the server 104, or a combination thereof.

The one or more processors of the first edge device 102A can further be programmed to detect a first potential traffic violation at the first point in time based on an overlap of the plurality of first bounding boxes or lines.

The first edge device 102A can then transmit an evidence package 316 comprising a segment of the first video 120A around the first point in time, the first positioning data 122A, the first timestamp 118A, the first set of vehicle attributes 126A, and the first alphanumeric string 124A representing the license plate of the vehicle 112 to the server 104.

In some embodiments, the length of the first video 120A transmitted to the server 104 can be configurable or adjustable.

Each of the edge devices 102 (including the first edge device 102A or the second edge device 102B) can be configured to continuously take videos of its surrounding environment (i.e., an environment outside of the carrier vehicle 110) as the carrier vehicle 110 traverses its usual route. Each edge device 102 can be configured to apply additional functions from the computer vision library 312 to such videos to (i) automatically segment video frames at a pixel-level, (ii) extract salient points 319 from the video frames, (iii) automatically identify objects shown in the videos, and (iv) semantically annotate or label the objects using the deep learning model 314. The one or more processors of each edge device 102 can also continuously determine the location of the edge device 102 and associate positioning data with objects (including landmarks) identified from the videos. The edge devices 102 can then transmit the videos, the salient points 317, the identified objects and landmarks, and the positioning data to the server 104 as part of a mapping procedure. The edge devices 102 can periodically or continuously transmit such videos and mapping data to the server 104. The videos and mapping data can be used by the server 104 to continuously train and optimize the deep learning model 314 and construct three-dimensional (3D) semantic annotated maps that can be used, in turn, by each of the edge devices 102 to further refine its violation detection capabilities.

As shown in FIG. 1B, a second carrier vehicle 110B having a second edge device 102B installed within or otherwise coupled to the second carrier vehicle 110B can drive by (i.e., next to) or behind the same vehicle 112 parked or stopped in the same restricted road area 114 at a second point in time after the first point in time. For example, the second carrier vehicle 110B can be driving in a lane or other roadway blocked by the vehicle 112. Alternatively, the second carrier vehicle 110B can be driving in an adjacent roadway 116 (e.g., a lane next to the restricted road area 114). The second carrier vehicle 110B can encounter the vehicle 112 while traversing its daily route (e.g., bus route, garbage collection route, etc.).

As shown in FIG. 1A, the second edge device 102B can capture a second video 120B of the vehicle 112 and the restricted road area 114 using one or more video image sensors 208 (see, e.g., FIGS. 5A-5E).

The second video 120B can comprise a second frame captured at a second point in time. The one or more processors of the second edge device 102B can be programmed to generate or record a second timestamp 118B reflecting the second point in time.

In one embodiment, the second video 120B can be a video in the MPEG-4 Part 12 or MP4 file format.

In some embodiments, the second video 120B can refer to one of the multiple videos captured by the various video image sensors 208. In other embodiments, the second video 120B can refer to one compiled video comprising multiple videos captured by the video image sensors 208. In further embodiments, the second video 120B can refer to all of the videos captured by all of the video image sensors 208.

The second edge device 102B can then determine a location of the vehicle 112 using, in part, a second positioning data 122B obtained from a second positioning unit (see, e.g., FIG. 2A) of the second edge device 102B. The second edge device 102B can also determine the location of the vehicle 112 using, in part, inertial measurement data obtained from a second IMU (see, e.g., FIG. 2A) and wheel odometry data 216 (see, FIG. 2A) obtained from a wheel odometer of the second carrier vehicle 110B.

One or more processors of the second edge device 102B can be programmed to automatically identify objects from the second video 120B by applying a plurality of functions from the computer vision library 312 to the second video 120B to, among other things, read video frames from the second video 120B and passing at least some of the video frames from the second video 120B, including the second frame, to a deep learning model 314 running on the second edge device 102B. For example, the vehicle 112 and the restricted road area 114 can be identified as part of this object detection step.

The one or more processors of the second edge device 102B can also pass at least some of the second video 120B to the deep learning model 314 to identify a second set of vehicle attributes 126B of the vehicle 112. The second set of vehicle attributes 126B can include a color of the vehicle 112, a make and model of the vehicle 112, and a vehicle type (e.g., a personal vehicle or a public service vehicle such as a fire truck, ambulance, parking enforcement vehicle, police car, etc.) identified by the second edge device 102B.

As will be discussed in more detail in later sections, the one or more processors of the second edge device 102B can also be programmed to bound the vehicle 112 and the restricted road area 114 in frames of the second video 120B in a plurality of second bounding boxes or lines (see, e.g., FIG. 9).

At least one of the video image sensors 208 of the second edge device 102B can be a dedicated LPR camera. The second video 120B can comprise at least one video frame or image showing a license plate of the vehicle 112. The second edge device 102B can pass the video frame captured by the LPR camera to a license plate recognition engine 304 (see, e.g., FIG. 3) running on the second edge device 102B to recognize a second alphanumeric string 124B representing a license plate of the vehicle 112.

In other embodiments not shown in the figures, the license plate recognition engine 304 can be run on the server 104. In further embodiments, the license plate recognition engine 304 can be run on the second edge device 102B and the server 104.

Alternatively, the second edge device 102B can pass a video frame captured by one of the other video image sensors 208 (e.g., one of the HDR cameras) to the license plate recognition engine 304 run on the second edge device 102B, the server 104, or a combination thereof.

The one or more processors of the second edge device 102B can further be programmed to detect a second potential traffic violation at the second point in time based on an overlap of the plurality of second bounding boxes or lines. The second edge device 102B can then transmit an evidence package 316 comprising a segment of the second video 120B around the second point in time, the second positioning data 122B, the second timestamp 118B, the second set of vehicle attributes 126B, and the second alphanumeric string 124B representing the license plate of the vehicle 112 to the server 104.

In some embodiments, the length of the second video 120B transmitted to the server 104 can be configurable or adjustable.

The server 104 can confirm or determine that a traffic violation has occurred based in part on comparing data and videos received from the first edge device 102A and the second edge device 102B. For example, the server 104 can determine that a traffic violation has occurred based in part on an elapsed time between the second point in time and the first point in time (as indicated by the timestamps) and a comparison of (i) the first alphanumeric string 124A with the second alphanumeric string 124B, (ii) the first set of vehicle attributes 126A with the second set of vehicle attributes 126B, and (iii) the first positioning data 122A with the second positioning data 122B. As a more specific example, the server 104 can determine that a traffic violation has occurred when: the (a) elapsed time is greater than a minimum time threshold set by the server 104, the (b) alphanumeric strings and the vehicles attributes match one another, and the (c) positioning data either match or the difference between such data is within acceptable ranges. The minimum time threshold can be adjusted based on a time restriction associated with the restricted road area 114 (e.g., if a curb is a 10-minute loading zone) or based on rules or regulations set by a municipality. Confirming or determining the traffic violation will be discussed in more detail in the later sections.

FIG. 1A also illustrates that the server 104 can transmit certain data and files to a third-party computing device/resource or client device 130. For example, the third-party computing device can be a server or computing resource of a third-party traffic violation processor. As a more specific example, the third-party computing device can be a server or computing resource of a government vehicle registration department. In other examples, the third-party computing device can be a server or computing resource of a subcontractor responsible for processing traffic violations for a municipality or other government entity.

The client device 130 can refer to a portable or non-portable computing device. For example, the client device 130 can refer to a desktop computer or a laptop computer. In other embodiments, the client device 130 can refer to a tablet computer or smartphone.

The server 104 can also generate or render a number of graphical user interfaces (GUIs) 334 (see, e.g., FIG. 3) that can be displayed through a web portal or mobile app run on the client device 130.

In other embodiments, the system 100 can offer an application programming interface (API) 331 designed to allow third-parties to access data and visualizations captured or collected by the edge devices 102, the server 104, or a combination thereof.

In some embodiments, at least one of the GUIs 334 can provide information concerning a potential traffic violation or determined traffic violation. For example, the GUI 334 can provide data or information concerning a time/date that the violation occurred, a location of the violation, a device identifier, and a carrier vehicle identifier. The GUI 334 can also provide a video player configured to play back video evidence of the traffic violation.

In another embodiment, the GUI 334 can comprise a live map showing real-time locations of all edge devices 102, traffic violations, and violation hot-spots. In yet another embodiment, the GUI 334 can provide a live event feed of all flagged events or potential traffic violations and the processing status of such violations. The GUIs 334 and the web portal or app 332 will be discussed in more detail in later sections.

Figure 2A:
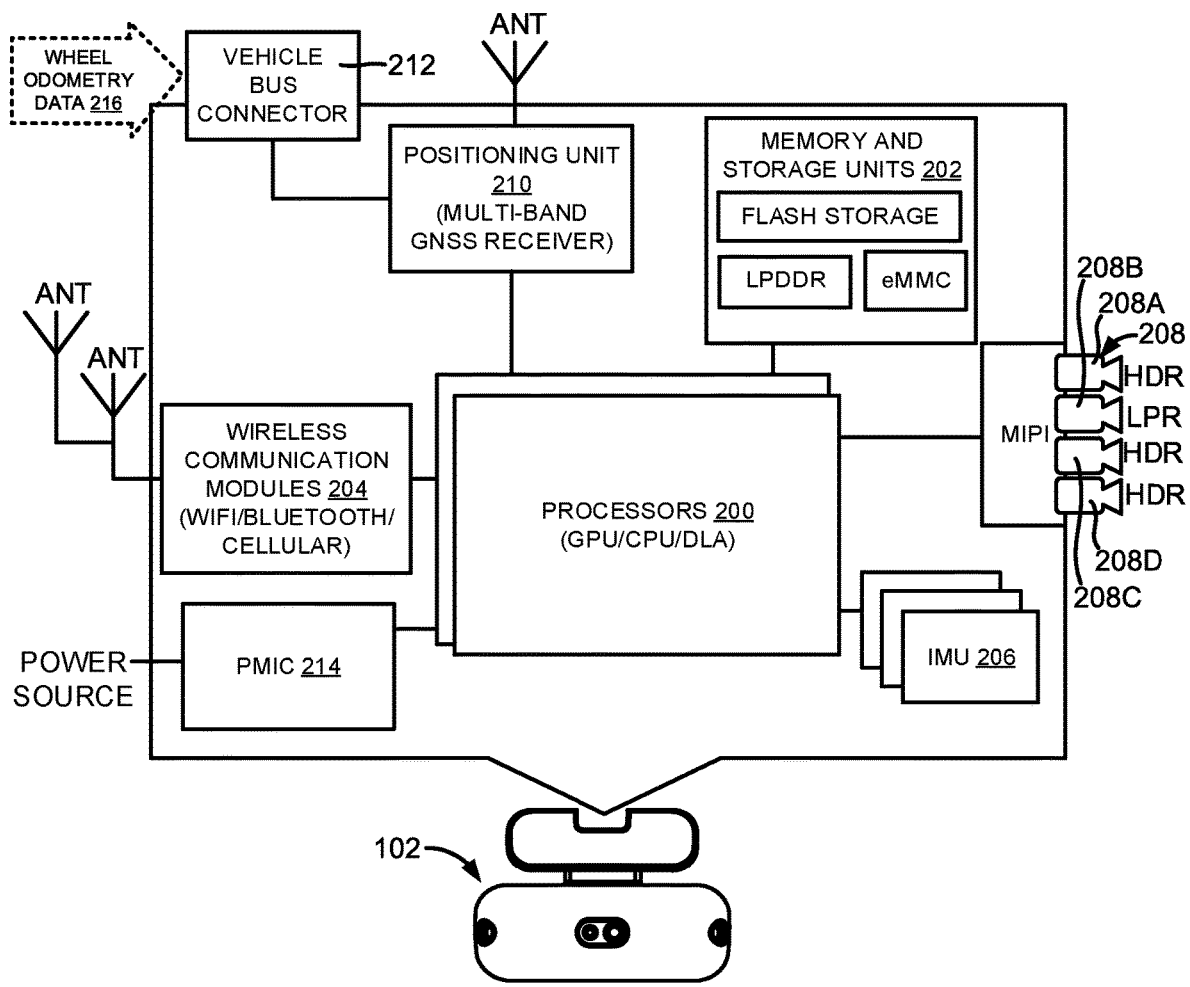
FIG. 2A illustrates one embodiment of an edge device of the system.

FIG. 2A illustrates one embodiment of an edge device 102 of the system 100. The edge device 100 can be any of the edge devices (e.g., the first edge device 102A or the second edge device 102B) disclosed herein. For purposes of this disclosure, any references to the edge device 102 can also be interpreted as a reference to a specific component, processor, module, chip, or circuitry within the edge device 102.

As shown in FIG. 2A, the edge device 102 can comprise a plurality of processors 200, memory and storage units 202, wireless communication modules 204, inertial measurement units (IMUs) 206, and video image sensors 208. The edge device 102 can also comprise a positioning unit 210, a vehicle bus connector 212, and a power management integrated circuit (PMIC) 214. The components of the edge device 102 can be connected to one another via high-speed buses or interfaces.

The processors 200 can include one or more central processing units (CPUs), graphical processing units (GPUs), Application-Specific Integrated Circuits (ASICs), field-programmable gate arrays (FPGAs), or a combination thereof. The processors 200 can execute software stored in the memory and storage units 202 to execute the methods or instructions described herein.

For example, the processors 200 can refer to one or more GPUs and CPUs of a processor module configured to perform operations or undertake calculations at a terascale. As a more specific example, the processors 200 of the edge device 102 can be configured to perform operations at 21 teraflops (TFLOPS). The processors 200 of the edge device 102 can be configured to run multiple deep learning models or neural networks in parallel and process data from multiple high-resolution sensors such as the plurality of video image sensors 208. More specifically, the processor module can be a Xavier NX™ module developed by NVIDIA Corporation. The processors 200 can comprise at least one GPU having a plurality of processing cores (e.g., between 300 and 400 processing cores) and tensor cores, at least one CPU (e.g., at least one 64-bit CPU having multiple processing cores), and a deep learning accelerator (DLA) or other specially-designed circuitry optimized for deep learning algorithms (e.g., an NVDLA™ engine developed by NVIDIA Corporation).

In some embodiments, at least part of the GPU's processing power can be utilized for object detection and license plate recognition. In these embodiments, at least part of the DLA's processing power can be utilized for object detection and lane line detection. Moreover, at least part of the CPU's processing power can be used for lane line detection and simultaneous localization and mapping. The CPU's processing power can also be used to run other functions and maintain the operation of the edge device 102.

The memory and storage units 202 can comprise volatile memory and non-volatile memory or storage. For example, the memory and storage units 202 can comprise flash memory or storage such as one or more solid-state drives, dynamic random access memory (DRAM) or synchronous dynamic random access memory (SDRAM) such as low-power double data rate (LPDDR) SDRAM, and embedded multi-media controller (eMMC) storage. For example, the memory and storage units 202 can comprise a 512 gigabyte (GB) SSD, an 8 GB 128-bit LPDDR4× memory, and 16 GB eMMC 5.1 storage device. Although FIG. 2A illustrates the memory and storage units 202 as separate from the processors 200, it should be understood by one of ordinary skill in the art that the memory and storage units 202 can be part of a processor module comprising at least some of the processors 200. The memory and storage units 202 can store software, firmware, data (including video and image data), tables, logs, databases, or a combination thereof.

The wireless communication modules 204 can comprise at least one of a cellular communication module, a WiFi communication module, a Bluetooth® communication module, or a combination thereof. For example, the cellular communication module can support communications over a 5G network or a 4G network (e.g., a 4G long-term evolution (LTE) network) with automatic fallback to 3G networks. The cellular communication module can comprise a number of embedded SIM cards or embedded universal integrated circuit cards (eUICCs) allowing the device operator to change cellular service providers over-the-air without needing to physically change the embedded SIM cards. As a more specific example, the cellular communication module can be a 4G LTE Cat-12 cellular module.

The WiFi communication module can allow the edge device 102 to communicate over a WiFi network such as a WiFi network provided by the carrier vehicle 110, a municipality, a business, or a combination thereof. The WiFi communication module can allow the edge device 102 to communicate over one or more WiFi (IEEE 802.11) commination protocols such as the 802.11n, 802.11ac, or 802.11ax protocol.

The Bluetooth® module can allow the edge device 102 to communicate with other edge devices or client devices over a Bluetooth® communication protocol (e.g., Bluetooth® basic rate/enhanced data rate (BR/EDR), a Bluetooth® low energy (BLE) communication protocol, or a combination thereof). The Bluetooth® module can support a Bluetooth® v4.2 standard or a Bluetooth v5.0 standard. In some embodiments, the wireless communication modules 204 can comprise a combined WiFi and Bluetooth® module.

Each of the IMUs 206 can comprise a 3-axis accelerometer and a 3-axis gyroscope. For example, the 3-axis accelerometer can be a 3-axis microelectromechanical system (MEMS) accelerometer and a 3-axis MEMS gyroscope. As a more specific example, the IMUs 206 can be a low-power 6-axis IMU provided by Bosch Sensortec GmbH.

The edge device 102 can comprise one or more video image sensors 208. In one example embodiment, the edge device 102 can comprise a plurality of video image sensors 208. As a more specific example, the edge device 102 can comprise four video image sensors 208 (e.g., a first video image sensor 208A, a second video image sensor 208B, a third video image sensor 208C, and a fourth video image sensor 208D). At least one of the video image sensors 208 can be configured to capture video at a frame rate of between 1 frame per second and 120 frames per second (FPS). In other embodiments, at least one of the video image sensors 208 can be configured to capture video at a frame rate of between 20 FPS and 80 FPS.

At least one of the video image sensors 208 (e.g., the second video image sensor 208B) can be a license plate recognition (LPR) camera having a fixed-focal or varifocal telephoto lens. In some embodiments, the LPR camera can comprise one or more infrared (IR) filters and a plurality of IR light-emitting diodes (LEDs) that allow the LPR camera to operate at night or in low-light conditions. The LPR camera can capture video images at a minimum resolution of 1920×1080 (or 2 megapixel (MP)). The LPR camera can also capture video at a frame rate of between 1 frame per second and 120 FPS. In other embodiments, the LPR camera can also capture video at a frame rate of between 20 FPS and 80 FPS.

The other video image sensors 208 (e.g., the first video image sensor 208A, the third video image sensor 208C, and the fourth video image sensor 208D) can be ultra-low-light high-dynamic range (HDR) image sensors. The HDR image sensors can capture video images at a minimum resolution of 1920×1080 (or 2MP). The HDR image sensors can also capture video at a frame rate of between 1 frame per second and 120 FPS. In certain embodiments, the HDR image sensors can also capture video at a frame rate of between 20 FPS and 80 FPS. In some embodiments, the video image sensors 208 can be or comprise ultra-low-light CMOS image sensors provided by Sony Semiconductor Solutions Corporation.

The video image sensors 208 can be connected to the processors 200 via a high-speed camera interface such as a Mobile Industry Processor Interface (MIPI) camera serial interface.

In alternative embodiments, the video image sensors 208 can refer to built-in video image sensors of the carrier vehicle 110. For example, the video images sensors 208 can refer to one or more built-in cameras included as part of the carrier vehicle's Advanced Driver Assistance Systems (ADAS).

The edge device 102 can also comprise a high-precision automotive-grade positioning unit 210. The positioning unit 210 can comprise a multi-band global navigation satellite system (GNSS) receiver configured to concurrently receive signals from a GPS satellite navigation system, a GLONASS satellite navigation system, a Galileo navigation system, and a BeiDou satellite navigation system. For example, the positioning unit 210 can comprise a multi-band GNSS receiver configured to concurrently receive signals from at least two satellite navigation systems including the GPS satellite navigation system, the GLONASS satellite navigation system, the Galileo navigation system, and the BeiDou satellite navigation system. In other embodiments, the positioning unit 210 be configured to receive signals from all four of the aforementioned satellite navigation systems or three out of the four satellite navigation systems. For example, the positioning unit 210 can be a ZED-F9K dead reckoning module provided by u-blox holding AG.

The positioning unit 210 can provide positioning data that can allow the edge device 102 to determine its own location at a centimeter-level accuracy. The positioning unit 210 can also provide positioning data that can be used by the edge device 102 to determine the location of the vehicle 112 (see, e.g., FIG. 1B). For example, the edge device 102 can use positioning data concerning its own location to substitute for the location of the vehicle 112. The edge device 102 can also use positioning data concerning its own location to estimate or approximate the location of the vehicle 112.

In other embodiments, the edge device 102 can determine the location of the vehicle 112 by recognizing an object or landmark (e.g., a bus stop sign) near the vehicle 112 with a known geolocation associated with the object or landmark. In these embodiments, the edge device 102 can use the location of the object or landmark as the location of the vehicle 112. In further embodiments, the location of the vehicle 112 can be determined by factoring in a distance calculated between the edge device 102 and the vehicle 112 based on a size of the license plate shown in one or more video frames of the video captured by the edge device 112 and a lens parameter of one of the video images sensors 208 (e.g., a zoom factor of the lens).

FIG. 2A also illustrates that the edge device 102 can comprise a vehicle bus connector 212. For example, the vehicle bus connector 212 can allow the edge device 102 to obtain wheel odometry data 216 from a wheel odometer of the carrier vehicle 110 carrying the edge device 102. For example, the vehicle bus connector 212 can be a J1939 connector. The edge device 102 can take into account the wheel odometry data 216 to determine the location of the vehicle 112 (see, e.g., FIG. 1B).

FIG. 2A illustrates that the edge device can comprise a PMIC 214. The PMIC 214 can be used to manage power from a power source. In some embodiments, the edge device 102 can be powered by a portable power source such as a battery. In other embodiments, the edge device 102 can be powered via a physical connection (e.g., a power cord) to a power outlet or direct-current (DC) auxiliary power outlet (e.g., 12V/24V) of the carrier vehicle 110.

Figure 2B:
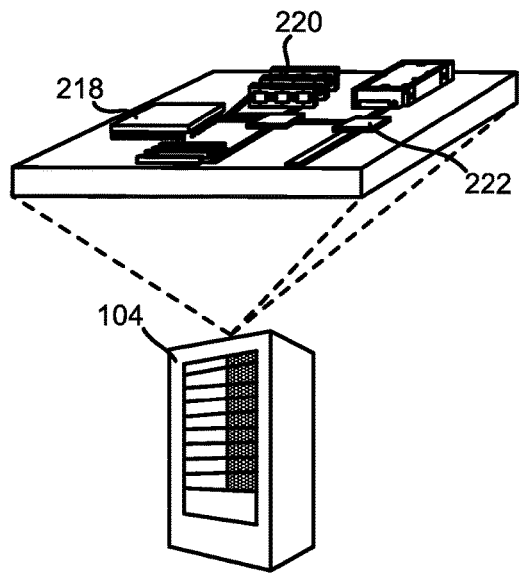
FIG. 2B illustrates one embodiment of a server of the system.

FIG. 2B illustrates one embodiment of the server 104 of the system 100. As previously discussed, the server 104 can comprise or refer to one or more virtual servers or virtualized computing resources. For example, the server 104 can refer to a virtual server or cloud server hosted and delivered by a cloud computing platform (e.g., Amazon Web Services®, Microsoft Azure®, or Google Cloud®). In other embodiments, the server 104 can refer to one or more physical servers or dedicated computing resources or nodes such as a rack-mounted server, a blade server, a mainframe, a dedicated desktop or laptop computer, one or more processors or processors cores therein, or a combination thereof.

For purposes of the present disclosure, any references to the server 104 can also be interpreted as a reference to a specific component, processor, module, chip, or circuitry within the server 104.

For example, the server 104 can comprise one or more server processors 218, server memory and storage units 220, and a server communication interface 222. The server processors 218 can be coupled to the server memory and storage units 220 and the server communication interface 222 through high-speed buses or interfaces.

The one or more server processors 218 can comprise one or more CPUs, GPUs, ASICs, FPGAs, or a combination thereof. The one or more server processors 218 can execute software stored in the server memory and storage units 220 to execute the methods or instructions described herein. The one or more server processors 218 can be embedded processors, processor cores, microprocessors, logic circuits, hardware FSMs, DSPs, or a combination thereof. As a more specific example, at least one of the server processors 218 can be a 64-bit processor.

The server memory and storage units 220 can store software, data (including video or image data), tables, logs, databases, or a combination thereof. The server memory and storage units 220 can comprise an internal memory and/or an external memory, such as a memory residing on a storage node or a storage server. The server memory and storage units 220 can be a volatile memory or a non-volatile memory. For example, the server memory and storage units 220 can comprise nonvolatile storage such as NVRAM, Flash memory, solid-state drives, hard disk drives, and volatile storage such as SRAM, DRAM, or SDRAM.

The server communication interface 222 can refer to one or more wired and/or wireless communication interfaces or modules. For example, the server communication interface 222 can be a network interface card. The server communication interface 222 can comprise or refer to at least one of a WiFi communication module, a cellular communication module (e.g., a 4G or 5G cellular communication module), and a Bluetooth®/BLE or other-type of short-range communication module. The server 104 can connect to or communicatively couple with each of the edge devices 102 via the server communication interface 222. The server 104 can transmit or receive packets of data using the server communication interface 222.

Figure 3:
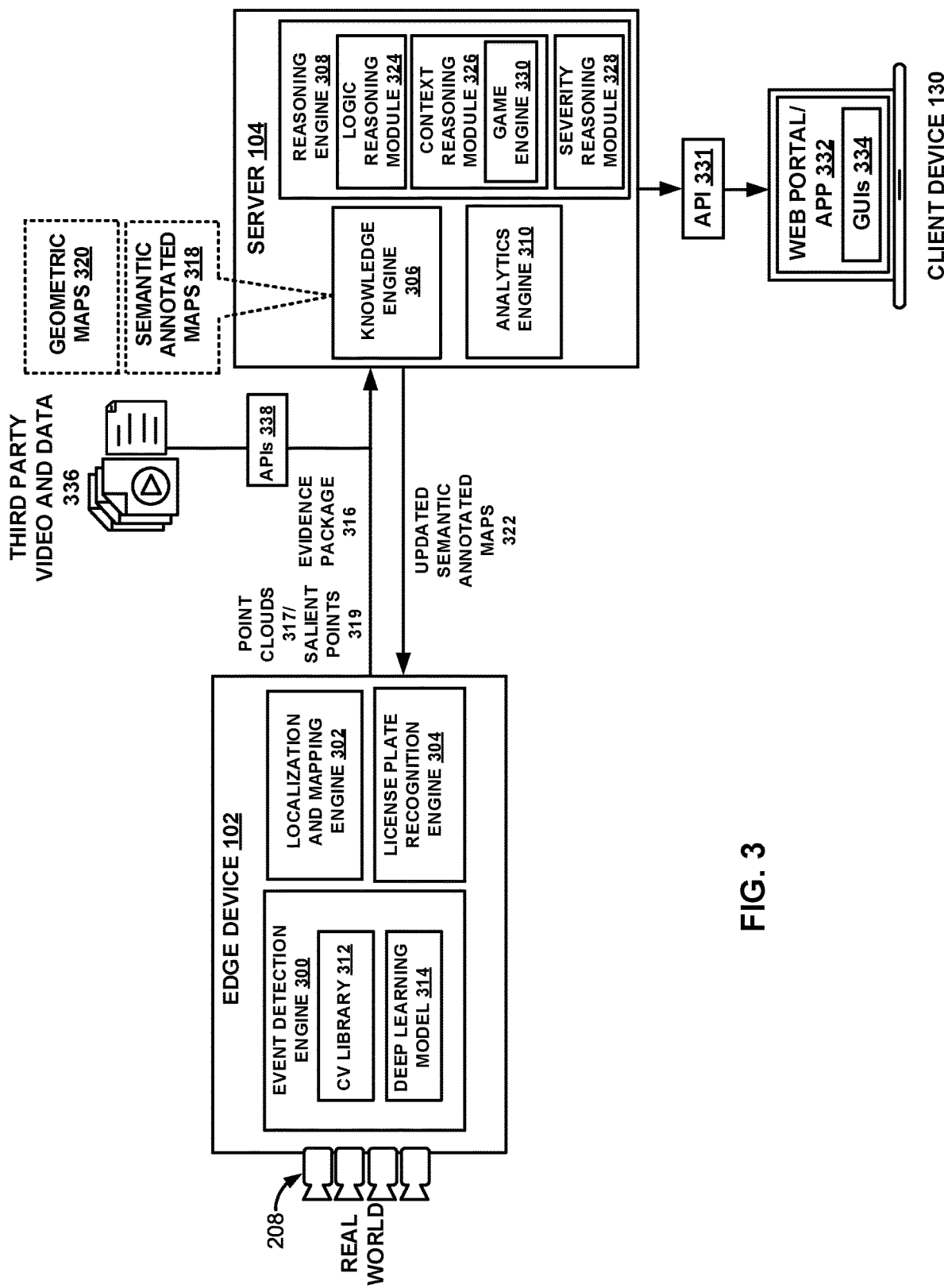
FIG. 3 illustrates various modules and engines of the edge device and server.

FIG. 3 illustrates certain modules and engines of the edge device 102 and the server 104. In some embodiments, the edge device 102 can comprise at least an event detection engine 300, a localization and mapping engine 302, and a license plate recognition engine 304. In these and other embodiments, the server 104 can comprise at least a knowledge engine 306, a reasoning engine 308, and an analytics engine 310.

Software instructions run on the edge device 102, including any of the engines and modules disclosed herein, can be written in the Java® programming language, C++ programming language, the Python® programming language, the Golang™ programming language, or a combination thereof. Software instructions run on the server 104, including any of the engines and modules disclosed herein, can be written in the Ruby® programming language (e.g., using the Ruby on Rails® web application framework), Python® programming language, or a combination thereof.

As previously discussed, the edge device 102 (e.g., the first edge device 102A, the second edge device 102B, or any other edge devices 102 deployed in a carrier vehicle 110) can continuously capture video of an external environment surrounding the edge device 102. For example, the video image sensors 208 of the edge device 102 can capture everything that is within a combined field of view 512 (see, e.g., FIG. 5C) of the video image sensors 208.

The event detection engine 300 can call a plurality of functions from a computer vision library 312 to read or otherwise obtain frames from the video (e.g., the first video 120A or the second video 120B) and enhance the video images by resizing, cropping, or rotating the video images.

In one example embodiment, the computer vision library 312 can be the OpenCV® library maintained and operated by the Open Source Vision Foundation. In other embodiments, the computer vision library 312 can be or comprise functions from the TensorFlow® software library, the SimpleCV® library, or a combination thereof.

The event detection engine 300 can then apply a semantic segmentation function from the computer vision library 312 to automatically annotate the video images at a pixel-level with semantic labels. The semantic labels can be class labels such as person, road, tree, building, vehicle, curb, sidewalk, traffic sign, fire hydrant, parking meter, lane line, etc. Pixel-level semantic segmentation can refer to associating a class label with each pixel of a video image.

The enhanced and semantically segmented images can be provided as training data by the event detection engine 300 to a deep learning model 314 running on the edge device 102. The enhanced and semantically segmented images can also be transmitted by the edge device 102 to the server 104 to be used to construct various semantic annotated maps 318 stored in the knowledge engine 306 of the server 104.

The deep learning model 314 can be or comprise a neural network trained for object detection. For example, the deep learning model 314 can be or comprise a convolutional neural network (CNN) comprising a plurality of convolutional layers and fully connected layers. The deep learning model 314 can be trained in part from video images of videos captured by the edge device 102. The deep learning model 314 can also be trained in part from video images of videos captured by other edge devices 102 (i.e., edge devices 102 other than the first edge device 102A and the second edge device 102B). For example, the deep learning model 314 can be trained using video images from videos captured by other edge devices 102 deployed in the same municipality or other carrier vehicles 110 in the same carrier fleet. The deep learning model 314 can also be trained using video images from videos captured by edge devices 102 at an earlier point in time.

In some embodiments, the deep learning model 314 can be the You Only Look Once (YOLO) object detection model. As a more specific example, the deep learning model 314 can be the YOLOv3 object detection model.

The event detection engine 300 can pass video frames in real-time to the deep learning model 314 to detect objects in real-time and apply bounding boxes (see, e.g., FIG. 9) to such objects. For example, the deep learning model 314 can apply class labels to detected objects and apply bounding boxes around such detected objects. The deep learning model 314 can also identify certain attributes of the detected objects. For example, the deep learning module 314 can identify a set of attributes of an object identified as a vehicle such as the color of the vehicle, the make and model of the vehicle, and the vehicle type (e.g., whether the vehicle is a personal vehicle or a public service vehicle).

As shown in FIG. 3, the edge device 102 can also comprise a license plate recognition engine 304. The license plate recognition engine 304 can be configured to recognize license plate numbers of vehicles in the video frames. For example, the license plate recognition engine 304 can pass a video frame or image captured by a dedicated LPR camera of the edge device 102 (e.g., the second video image sensor 208B of FIGS. 2A, 5A, and 5D) to a machine learning model specifically trained to recognize license plate numbers from video images. Alternatively, the license plate recognition engine 304 can pass a video frame or image captured by one of the HDR image sensors (e.g., the first video image sensor 208A, the third video image sensor 208C, or the fourth video image sensor 208D) to the machine learning model trained to recognize license plate numbers from such video frames or images.

As a more specific example, the machine learning model can be or comprise a deep learning network or a convolutional neural network specifically trained to recognize license plate numbers from video images. In some embodiments, the machine learning model can be or comprise the OpenALPR™ license plate recognition model. The license plate recognition engine 304 can use the machine learning model to recognize alphanumeric strings representing license plate numbers from video images comprising license plates.

In alternative embodiments, the license plate recognition engine 304 can be run on the server 104. In additional embodiments, the license plate recognition engine 304 can be run on both the edge device 102 and the server 104.

Figure 9:
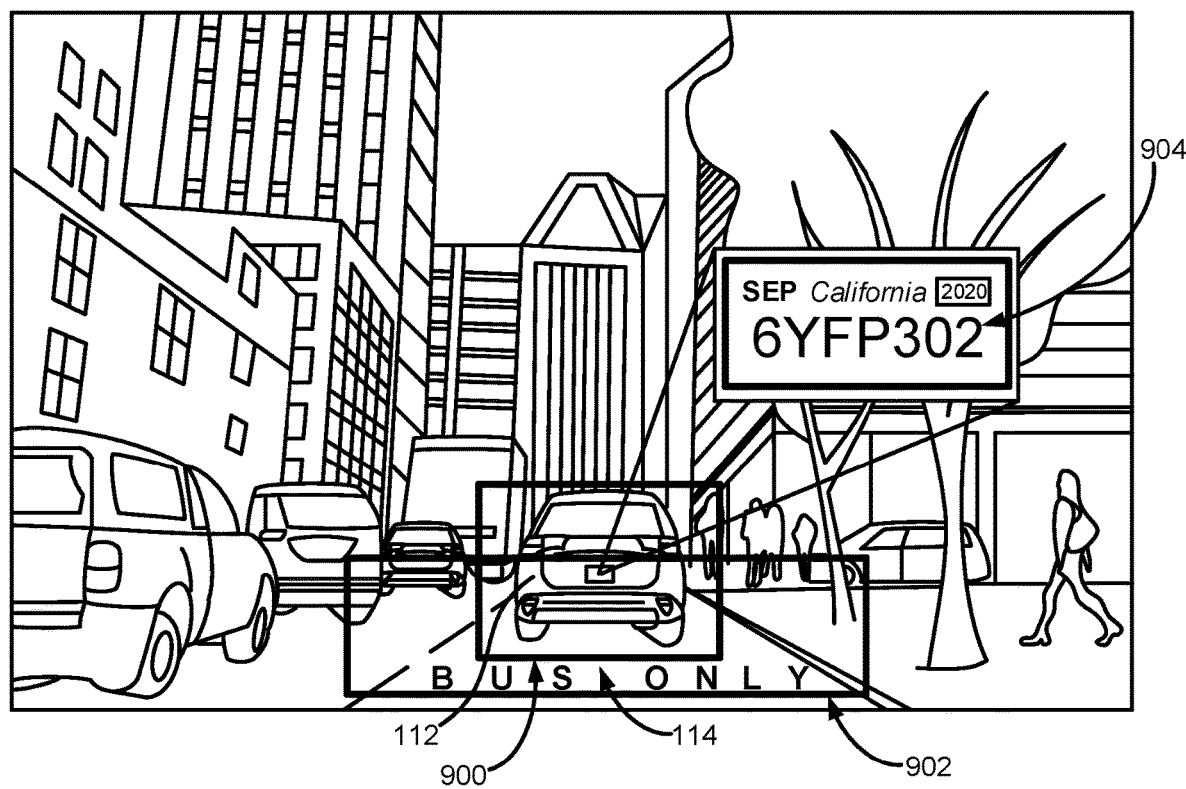
FIG. 9 is a visual representation of bounding boxes being applied to a vehicle and a restricted road area and a license plate of the vehicle being recognized.

When a vehicle (e.g., the vehicle 112) is parked illegally in a restricted road area 114 (e.g., a bus lane or bike lane), the event detection engine 300 can bound the vehicle in the video frames or images with a vehicular bounding box 900 and bound at least a segment of the restricted road area 114 in the video frames or images with a road bounding box 902 (see, e.g., FIG. 9). Moreover, the event detection engine 300 can identify the color of the vehicle, the make and model of the vehicle, and the vehicle type from video frames or images. The event detection engine 300 can detect at least some overlap between the vehicular bounding box 900 and the road bounding box 902 when the vehicle is parked in the restricted road area 114.

The event detection engine 300 can detect that a potential traffic violation has occurred based on a detected overlap between the vehicular bounding box 900 and the road bounding box 902. The event detection engine 300 can then generate an evidence package 316 to be transmitted to the server 104. In some embodiments, the evidence package 316 can comprise clips or segments of the relevant video(s) captured by the edge device 102, a timestamp of the event recorded by the event detection engine 300, an alphanumeric string representing the license plate number of the offending vehicle (e.g., the vehicle 112), and the location of the offending vehicle as determined by the localization and mapping engine 302.

The localization and mapping engine 302 can determine the location of the offending vehicle (e.g., the vehicle 112) using any combination of positioning data obtained from the positioning unit 210, inertial measurement data obtained from the IMUs 206, and wheel odometry data 216 obtained from the wheel odometer of the carrier vehicle 110 carrying the edge device 102. For example, the localization and mapping engine 302 can use positioning data concerning the current location of the edge device 102 to estimate or approximate the location of the offending vehicle. Moreover, the localization and mapping engine 302 can determine the location of the offending vehicle by recognizing an object or landmark (e.g., a bus stop sign) near the vehicle with a known geolocation associated with the object or landmark. In some embodiments, the localization and mapping engine 302 can further refine the determined location of the offending vehicle by factoring in a distance calculated between the edge device 102 and the offending vehicle based on a size of the license plate shown in one or more video frames and a lens parameter of one of the video images sensors 208 (e.g., a zoom factor of the lens) of the edge device 102.

The localization and mapping engine 302 can also be configured to call on certain functions from the computer vision library 312 to extract point clouds 317 comprising a plurality of salient points 319 (see, also, FIG. 7) from the videos captured by the video image sensors 208. The salient points 319 can be visually salient features or key points of objects shown in the videos. For example, the salient points 319 can be the key features of a building, a vehicle, a tree, a road, a fire hydrant, etc. The point clouds 317 or salient points 319 extracted by the localization and mapping engine 302 can be transmitted from the edge device 102 to the server 104 along with any semantic labels used to identify the objects defined by the salient points 319. The point clouds 317 or salient points 319 can be used by the knowledge engine 306 of the server 104 to construct three-dimensional (3D) semantic annotated maps 318. The 3D semantic annotated maps 318 can be maintained and updated by the server 104 and transmitted back to the edge devices 102 to aid in violation detection.

In this manner, the localization and mapping engine 302 can be configured to undertake simultaneous localization and mapping. The localization and mapping engine 302 can associate positioning data with landmarks, structures, and roads shown in the videos captured by the edge device 102. Data and video gathered by each of the edge devices 102 can be used by the knowledge engine 306 of the server 104 to construct and maintain the 3D semantic annotated maps 318. Each of the edge devices 102 can periodically or continuously transmit the salient points 319/points clouds, semantic labels, and positioning data gathered by the localization and mapping engine 302 to the server 104 for the purposes of constructing and maintaining the 3D semantic annotated maps 318.

The knowledge engine 306 of the server 104 can be configured to construct a virtual 3D environment representing the real world environment captured by the video image sensors 208 of the edge devices 102. The knowledge engine 306 can be configured to construct the 3D semantic annotated maps 318 from videos and data received from the edge devices 102 and continuously update such maps based on new videos or data received from the edge devices 102. The knowledge engine 306 can use inverse perspective mapping to construct the 3D semantic annotated maps 318 from two-dimensional (2D) video image data obtained from the edge devices 102.

The semantic annotated maps 318 can be built on top of existing standard definition maps and can be built on top of geometric maps 320 constructed from sensor data and salient points 319 obtained from the edge devices 102. For example, the sensor data can comprise data from the positioning units 210 and IMUs 206 of the edge devices 102 and wheel odometry data 216 from the carrier vehicles 110.

The geometric maps 320 can be stored in the knowledge engine 306 along with the semantic annotated maps 318. The knowledge engine 306 can also obtain data or information from one or more government mapping databases or government GIS maps to construct or further fine-tune the semantic annotated maps 318. In this manner, the semantic annotated maps 318 can be a fusion of mapping data and semantic labels obtained from multiple sources including, but not limited to, the plurality of edge devices 102, municipal mapping databases, or other government mapping databases, and third-party private mapping databases. The semantic annotated maps 318 can be set apart from traditional standard definition maps or government GIS maps in that the semantic annotated maps 318 are: (i) three-dimensional, (ii) accurate to within a few centimeters rather than a few meters, and (iii) annotated with semantic and geolocation information concerning objects within the maps. For example, objects such as lane lines, lane dividers, crosswalks, traffic lights, no parking signs or other types of street signs, fire hydrants, parking meters, curbs, trees or other types of plants, or a combination thereof are identified in the semantic annotated maps 318 and their geolocations and any rules or regulations concerning such objects are also stored as part of the semantic annotated maps 318. As a more specific example, all bus lanes or bike lanes within a municipality and their hours of operation/occupancy can be stored as part of a semantic annotated map 318 of the municipality.

The semantic annotated maps 318 can be updated periodically or continuously as the server 104 receives new mapping data, positioning data, and/or semantic labels from the various edge devices 102. For example, a bus serving as a carrier vehicle 100 having an edge device installed within the bus can drive along the same bus route multiple times a day. Each time the bus travels down a specific roadway or passes by a specific landmark (e.g., building or street sign), the edge device 102 on the bus can take video(s) of the environment surrounding the roadway or landmark. The videos can first be processed locally on the edge device 102 (using the computer vision tools and deep learning models previously discussed) and the outputs (e.g., the detected objects, semantic labels, and location data) from such detection can be transmitted to the knowledge engine 306 and compared against data already included as part of the semantic annotated maps 318. If such labels and data match or substantially match what is already included as part of the semantic annotated maps 318, the detection of this roadway or landmark can be corroborated and remain unchanged. If, however, the labels and data do not match what is already included as part of the semantic annotated maps 318, the roadway or landmark can be updated or replaced in the semantic annotated maps 318. An update or replacement can be undertaken if a confidence level or confidence value of the new objects detected is higher than the confidence level or confidence value of objects previously detected by the same edge device 102 or another edge device 102. This map updating procedure or maintenance procedure can be repeated as the server 104 receives more data or information from additional edge devices 102.

As shown in FIG. 3, the server 104 can transmit or deploy revised or updated semantic annotated maps 322 to the edge devices 102. For example, the server 104 can transmit or deploy revised or updated semantic annotated maps 322 periodically or when an update has been made to the existing semantic annotated maps 318. The updated semantic annotated maps 322 can be used by the edge device 102 to more accurately localize restricted road areas 114 to ensure accurate detection. Ensuring that the edge devices 102 have access to updated semantic annotated maps 322 reduces the likelihood of false positive detections.

The knowledge engine 306 can also store all event data or files included as part of any evidence packages 316 received from the edge devices 102 concerning potential traffic violations. The knowledge engine 306 can then pass certain data or information from the evidence package 316 to the reasoning engine 308 of the server 104.

The reasoning engine 308 can comprise a logic reasoning module 324, a context reasoning module 326, and a severity reasoning module 328. The context reasoning module 326 can further comprise a game engine 330 running on the server 104.

The logic reasoning module 324 can use logic (e.g., logic operators) to filter out false positive detections. For example, the logic reasoning module 324 can look up the alphanumeric string representing the detected license plate number of the offending vehicle in a government vehicular database (e.g., a Department of Motor Vehicles database) to see if the registered make/model of the vehicle associated with the detected license plate number matches the vehicle make/model detected by the edge device 102. If such a comparison results in a mismatch, the potential traffic violation can be considered a false positive. Moreover, the logic reasoning module 324 can also compare the location of the purported restricted road area 114 against a government database of all restricted roadways or zones to ensure that the detected roadway or lane is in fact under certain restrictions or prohibitions against entry or parking. If such comparisons result in a match, the logic reasoning module 324 can pass the data and files included as part of the evidence package 316 to the context reasoning module 326.

The context reasoning module 326 can use a game engine 330 to reconstruct the violation as a game engine simulation 1000 (see, e.g., FIG. 10) in a 3D virtual environment. The context reasoning module 326 can also visualize or render the game engine simulation 1000 as a video clip that can be presented through a web portal or app 332 run on a client device 130 in communication with the server 104.

The game engine simulation 1000 (see, e.g., FIG. 10) can be a simulation of the potential traffic violation captured by the video image sensors 208 of the edge device 102.

For example, the game engine simulation 1000 can be a simulation of a car parked or driving illegally in a bus lane or bike lane. In this example, the game engine simulation 1000 can include not only the car and the bus or bike lane but also other vehicles or pedestrians in the vicinity of the car and their movements and actions.

The game engine simulation 1000 can be reconstructed from videos and data received from the edge device 102. For example, the game engine simulation 1000 can be constructed from videos and data included as part of the evidence package 316 received from the edge device 102. The game engine 330 can also use semantic labels and other data obtained from the semantic annotated maps 318 to construct the game engine simulation 1000.

In some embodiments, the game engine 330 can be a game engine built on the Unreal Engine® creation platform. For example, the game engine 330 can be the CARLA simulation creation platform. In other embodiments, the game engine 330 can be the Godot™ game engine or the Armory™ game engine.

The context reasoning module 326 can use the game engine simulation 1000 to understand a context surrounding the traffic violation. The context reasoning module 326 can apply certain rules to the game engine simulation 1000 to determine if a potential traffic violation is indeed a traffic violation or whether the violation should be mitigated. For example, the context reasoning module 326 can determine a causation of the potential traffic violation based on the game engine simulation 1000. As a more specific example, the context reasoning module 326 can determine that the vehicle 112 stopped only temporarily in the restricted road area 114 to allow an emergency vehicle to pass by. Rules can be set by the context reasoning module 326 to exclude certain detected violations when the game engine simulation 1000 shows that such violations were caused by one or more mitigating circumstances (e.g., an emergency vehicle passing by or another vehicle suddenly swerving into a lane). In this manner, the context reasoning module 326 can use the game engine simulation 1000 to determine that certain potential traffic violations should be considered false positives.

If the context reasoning module 326 determines that no mitigating circumstances are detected or discovered, the data and videos included as part of the evidence package 316 can be passed to the severity reasoning module 328. The severity reasoning module 328 can make the final determination as to whether a traffic violation has indeed occurred by comparing data and videos received from a first edge device 102A and a second edge device 102B.

For example, each of the two edge devices 102 can capture video of the same vehicle 112 parked in the same restricted road area 114. More specifically, the first edge device 102A can capture a first video 120A where at least one of the frames, captured at a first point in time, shows the vehicle 112 parked in the restricted road area 114. In addition, the second edge device 102B can capture a second video 120B where at least one of the frames, captured at a second point in time after the first point in time, shows the same vehicle 112 parked in the same restricted road area 114. A first timestamp 118A generated or recorded by the first edge device 102A can reflect the first point in time and a second timestamp 118B generated or recorded by the second edge device 102B can reflect the second point in time. The first edge device 102A can transmit to the server 104 an evidence package 316 comprising a configurable clip of the first video 120A, a first alphanumeric string 124A representing a recognized license plate number of the vehicle 112, a first set of vehicle attributes 126A such as a recognized color, make/model, and vehicle type of the vehicle 112, the first timestamp 118A, and a first positioning data 122A representing an estimated location of the vehicle 112. The second edge device 102B can transmit to the server 104, at a later point in time, another evidence package 316 comprising a configurable clip of the second video 120B, a second alphanumeric string 124B representing a recognized license plate of the vehicle 112, a second set of vehicle attributes 126B such as a recognized color, make/model, and vehicle type of the vehicle 112, the second timestamp 118B, and a second positioning data 122B representing an estimated location of the vehicle 112.

The severity reasoning module 328 can make a final determination that a traffic violation has occurred based in part on an elapsed time between the first timestamp 118A and the second timestamp 118B and a comparison of (i) the first alphanumeric string 124A with the second alphanumeric string 124B, (ii) the first set of vehicle attributes 126A with the second set of vehicle attributes 126B, and (iii) the first positioning data 122A with the second positioning data 122B. As a more specific example, the severity reasoning module 328 can determine that a traffic violation has indeed occurred when: the (a) elapsed time is greater than a minimum time threshold set by the severity reasoning module 328, the (b) alphanumeric strings and the vehicles attributes match one another, and (c) the positioning data either match or any difference between the positioning data are within acceptable ranges. The minimum time threshold can be adjusted based on a time restriction associated with the restricted road area 114 or based on rules or regulations set by a municipality. For example, the minimum time threshold can be adjusted based on the type of restricted road area 114 (i.e., whether the restricted road area 114 is a bus lane, a bike lane, a no-parking curb, a passenger loading or unloading zone, etc.).

In some embodiments, the minimum time threshold can be adjusted by the severity reasoning module 328 based on a time-of-day, a day-of-the-week, an event occurring in a municipality, or certain holidays. The severity reasoning module 328 can also set additional time thresholds such as a plurality of severity time thresholds. For example, the severity reasoning module 328 can set the severity time thresholds as being five-minutes (for a non-severe violation), ten-minutes (for a severe violation), or twenty-minutes (for an extremely severe violation). The severity reasoning module 328 can tag or label the determined traffic violation with a severity level based on whether the elapsed time between the first timestamp 118A and the second timestamp 118B exceeded one of the severity time thresholds.

As shown in FIG. 3, the server 104 can also comprise an analytics engine 310. The analytics engine 310 can be configured to render visualizations, event feeds, and/or a live map showing the locations of all potential or confirmed traffic violations. The analytics engine 310 can also provide insights or predictions based on the traffic violations detected. For example, the analytics engine 310 can determine violation hotspots and render graphics visualizing such hotspots.

The visualizations, event feeds, and live maps rendered by the analytics engine 310 can be accessed through a web portal or app 332 run on a client device 130 able to access the server 104 or be communicatively coupled to the server 104. The client device 130 can be used by a third-party reviewer (e.g., a law enforcement official or a private contractor) to review the detected traffic violations.

In some embodiments, the web portal can be a browser-based portal and the app can be a downloadable software application such as a mobile application. More specifically, the mobile application can be an Apple® iOS mobile application or an Android® mobile application.

The server 104 can render one or more graphic user interfaces (GUIs) 334 that can be accessed or displayed through the web portal or app 332. For example, one of the GUIs 334 can comprise a live map showing real-time locations of all edge devices 102, traffic violations, and violation hot-spots. Another of the GUIs 334 provide a live event feed of all flagged events or potential traffic violations and the processing status of such violations. Yet another GUI 334 can be a violation review GUI 1100 (see, e.g., FIG. 11) that can play back video evidence of a traffic violation along with data or information concerning a time/date that the violation occurred, a determined location of the violation, a device identifier, and a carrier vehicle identifier. As will be discussed in more detail in the following sections, the violation review GUI 1100 can provide a user of the client device 130 with user interface elements to approve or reject a violation.

In other embodiments, the system 100 can offer an application programming interface (API) 331 designed to allow third-parties to access data and visualizations captured or collected by the edge devices 102, the server 104, or a combination thereof.

One technical problem faced by those in the field of automated traffic violation detection is how to lower the rate of false positive detection. One effective technical solution offered by the applicant is the system 100 and methods disclosed herein where potential traffic violations are initially detected by the edge device 102 and the evidence packages 316 concerning such violations are transmitted to the server 104 that acts as the final arbiter using, in part, logic reasoning and context reasoning. Moreover, the server 104 can reduce the rate of false positive detection even further by allowing a third-party reviewer to review evidence of the detected violation through a web portal or software application running on a client device 130 in communication with the server 104.

Another technical problem faced by those in the field of automated traffic violation detection is how to balance the processing load so that a server or cloud computing resource is not responsible for all detection tasks, which can slow down the detection process and require large video files to be continuously transmitted to the server 104 for real-time or near real-time detection. One effective technical solution offered by the applicant is the system 100 and methods disclosed herein where videos captured by the video image sensors 208 of the edge device 102 are first processed on the fly with multiple power processors of the edge device 102 using computer vision tools and deep learning models and then a compiled evidence package 316 is transmitted to the server 104 for further processing only when a potential violation is detected. This also alleviates any privacy concerns associated with deploying edge devices 102 configured to capture videos of public streets and scenery.

Yet another technical problem faced by those in the field of automated traffic violation detection is that the standard geo-maps used by those in the field are often outdated, inaccurate, and do not reflect the real-world environment. One effective technical solution offered by the applicant is the system 100 and methods disclosed herein which uses the edge devices 102 to not only conduct violation detection but also gather real-time videos of the real-world environment and extract point clouds 317 comprising a plurality of salient points 319 defining objects within such videos and transmit such point clouds 317, along with semantic labels of such objects, to the server 104 to construct and update semantic annotated maps that are then pushed back to the edge devices 102 to aid in traffic violation detection.

FIG. 3 also illustrates that the server 104 can receive third party video and data 336 concerning a potential traffic violation. The server 104 can receive the third party video and data 336 via one or more application programming interfaces (APIs) 338. For example, the server 104 can receive third party video and data 336 from a third-party mapping service, a third-party violation detection service or camera operator, or a fleet of autonomous or semiautonomous vehicles. For example, the knowledge engine 306 can use the third party video and data 336 to construct or update the semantic annotated maps 318. Also, for example, the reasoning engine 308 can use the third party video and data 336 to determine whether a traffic violation has indeed occurred and to gauge the severity of the violation. The analytics engine 310 can use the third party video and data 336 to generate graphics, visualizations, or maps concerning violations detected from such third party video and data 336.

Figure 4:
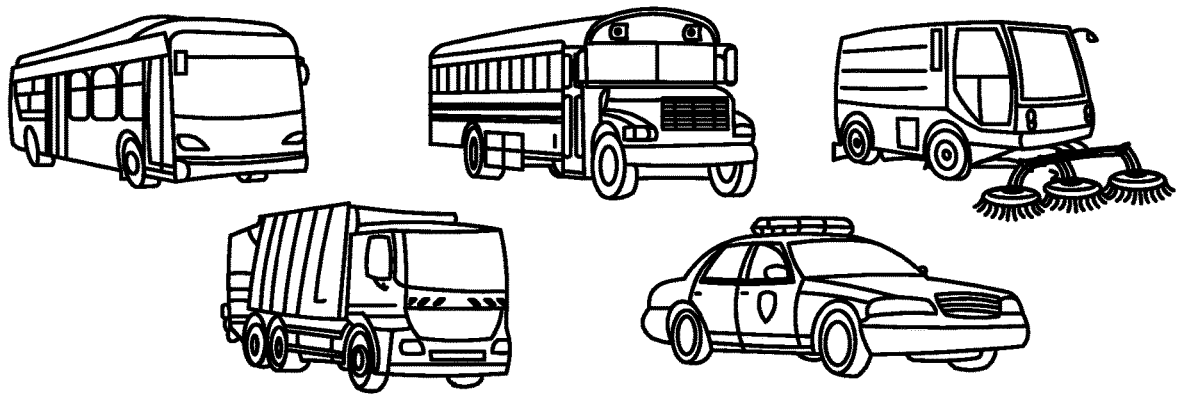
FIG. 4 illustrates different examples of carrier vehicles used to carry the edge device.
Figure 4:
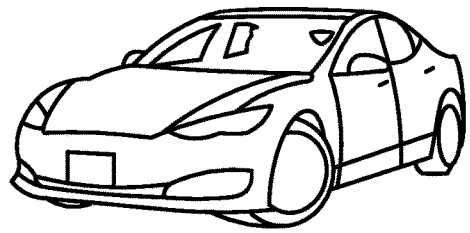
Figure 4:
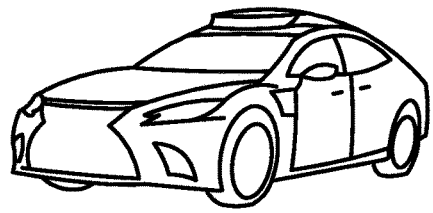

FIG. 4 illustrates that, in some embodiments, the carrier vehicle 400 can be a municipal fleet vehicle. For example, the carrier vehicle 110 can be a transit vehicle such as a municipal bus, train, or light-rail vehicle, a school bus, a street sweeper, a sanitation vehicle (e.g., a garbage truck or recycling truck), a traffic or parking enforcement vehicle, or a law enforcement vehicle (e.g., a police car or highway patrol car), a tram or light-rail train.

In other embodiments, the carrier vehicle 110 can be a semi-autonomous vehicle such as a vehicle operating in one or more self-driving modes with a human operator in the vehicle. In further embodiments, the carrier vehicle 110 can be an autonomous vehicle or self-driving vehicle.

In certain embodiments, the carrier vehicle 110 can be a private vehicle or vehicle not associated with a municipality or government entity.

As will be discussed in more detail in the following sections, the edge device 102 can be detachably or removably coupled to the carrier vehicle 400. For example, the edge device 102 can comprise an attachment arm 502 (see FIGS. 5A-5D) for securing or otherwise coupling the edge device 102 to a window or dashboard of the carrier vehicle 110. As a more specific example, the edge device 102 can be coupled to a front windshield, a rear windshield, a side window, a front dashboard, or a rear deck or dashboard of the carrier vehicle 110.

In some embodiments, the edge device 102 can be coupled to an exterior surface or side of the carrier vehicle 110 such as a front, lateral, or rear exterior surface or side of the carrier vehicle 110. In additional embodiments, the edge device 102 can be coupled to a component or arm extending from the carrier vehicle 110. For example, the edge device 102 can be coupled to a stop arm (i.e., an arm carrying a stop sign) of a school bus.

As previously discussed, the system 100 can comprise edge devices 102 installed in or otherwise coupled carrier vehicles 110 deployed within a geographic area or municipality. For example, an edge device 102 can be coupled to a front windshield or dash/deck of each of a bus driving around a city on its daily bus route. Also, for example, an edge device 102 can be coupled to a front windshield or dash/deck of a street sweeper on its daily sweeping route or a garbage/recycling truck on its daily collection route.

One problem faced by most municipalities is how to cost-effectively monitor low-level traffic violations at scale in a municipal locale. One effective solution offered by the applicant is the system 100 and methods disclosed herein which uses municipal fleet vehicles already deployed in the municipal locale to assist with automated traffic enforcement by coupling an edge device 102 comprising a plurality of video image sensors 208 to the municipal fleet vehicle.

It is also contemplated by this disclosure that the edge device 102 can be carried by or otherwise coupled to a micro-mobility vehicle (e.g., an electric scooter). In other embodiments contemplated by this disclosure, the edge device 102 can be carried by or otherwise coupled to a UAV or drone.

FIGS. 5A and 5B illustrate front and right side views, respectively, of one embodiment of the edge device 102. The edge device 102 can comprise a device housing 500 and an attachment arm 502.

The device housing 500 can be substantially shaped as an elongate cuboid having rounded corners and edges. In other embodiments, the device housing 500 can be substantially shaped as a rectangular box, an ovoid, a truncated pyramid, a sphere, or any combination thereof.

In some embodiments, the device housing 500 can be made in part of a polymeric material, a metallic material, or a combination thereof. For example, the device housing 500 can be made in part of a rigid polymeric material such as polycarbonate, acrylanitrile butadiene styrene (ABS), or a combination thereof. The device housing 500 can also be made in a part of an aluminum alloy, stainless steel, titanium, or a combination thereof. In some embodiments, at least portions of the device housing 500 can be made of glass (e.g., the parts covering the image sensor lenses).

As shown in FIGS. 5A and 5B, when the device housing 500 is implemented as an elongate cuboid, the device housing 500 can have a housing length 504, a housing height 506, and a housing depth 508. In some embodiments, the housing length 504 can be between about 150 mm and about 250 mm. For example, the housing length 504 can be about 200 mm. The housing height 506 can be between about 50 mm and 100 mm. For example, the housing height 506 can be about 75 mm. The housing depth 508 can be between about 50 mm and 100 mm. For example, the housing depth 508 can be about 75 mm.

In some embodiments, the attachment arm 502 can extend from a top of the device housing 500. In other embodiments, the attachment arm 502 can also extend from a bottom of the device housing 500. As shown in FIG. 5B, at least one of the linkages of the attachment arm 502 can rotate with respect to one or more of the other linkage(s) of the attachment arm 502 to tilt the device housing 500. The device housing 500 can be tilted to allow a driver of the carrier vehicle 110 or an installer of the edge device 102 to obtain better camera angles or account for a slant or angle of the vehicle's windshield.

The attachment arm 502 can comprise a high bonding adhesive 510 at a terminal end of the attachment arm 502 to allow the attachment arm 502 to be adhered to a windshield (e.g., a front windshield or a rear windshield), window, or dashboard of the carrier vehicle 110. In some embodiments, the high bonding adhesive 510 can be a very high bonding (VHB) adhesive layer or tape, an ultra-high bonding (UHB) adhesive layer or tape, or a combination thereof. As shown in FIGS. 5B and 5E, in one example embodiment, the attachment arm 502 can be configured such that the adhesive 510 faces forward or in a forward direction above the device housing 500. In other embodiments not shown in the figures but contemplated by this disclosure, the adhesive 510 can face downward below the device housing 500 to allow the attachment arm 502 to be secured to a dashboard or deck of the carrier vehicle 110.

In other embodiments contemplated by this disclosure but not shown in the figures, the attachment arm 502 can be detachably or removably coupled to a windshield, window, or dashboard of the carrier vehicle 110 via a suction mechanism (e.g., one or more releasable high-strength suction cups), a magnetic connector, or a combination thereof with or without adhesives. In additional embodiments, the device housing 500 can be fastened or otherwise coupled to an exterior surface or interior surface of the carrier vehicle 110 via screws or other fasteners, clips, nuts and bolts, adhesives, suction cups, magnetic connectors, or a combination thereof.

In further embodiments contemplated by this disclosure but not shown in the figures, the attachment arm 502 can be detachably or removably coupled to a micro-mobility vehicle or a UAV or drone. For example, the attachment arm 502 can be detachably or removably coupled to a handrail/handlebar of an electric scooter. Also, for example, the attachment arm 502 can be detachably or removably coupled to a mount or body of a drone or UAV.

FIGS. 5A-5D illustrate that the device housing 500 can house or contain all of the electronic components (see, e.g., FIG. 2A) of the edge device 102 including the plurality of video image sensors 208. For example, the video image sensors 208 can comprise a first video image sensor 208A, a second video image sensor 208B, a third video image sensor 208C, and a fourth video image sensor 208D.

As shown in FIG. 5A, one or more of the video image sensors 208 can be angled outward or oriented in one or more peripheral directions relative to the other video image sensors 208 facing forward. The edge device 102 can be positioned such that the forward facing video image sensors (e.g., the second video image sensor 208B and the third video image sensor 208C) are oriented in a direction of forward travel of the carrier vehicle 110. In these embodiments, the angled video image sensors (e.g., the first video image sensor 208A and the fourth video image sensor 208D) can be oriented such that the environment surrounding the carrier vehicle 110 or to the periphery of the carrier vehicle 110 can be captured by the angled video image sensors. The first video image sensor 208A and the fourth video image sensor 208D can be angled with respect to the second video image sensor 208B and the third video image sensor 208C.

In the example embodiment shown in FIG. 5A, the device housing 500 can be configured such that the camera or sensor lenses of the forward facing image video sensors (e.g., the second video image sensor 208B and the third video image sensor 208C) are exposed along the length or long side of the device housing 500 and each of the angled video image sensors (e.g., the first video image sensor 208A and the fourth video image sensor 208D) is exposed along an edge or side of the device housing 500.

When in operation, the forward facing video image sensors can capture videos of the environment (e.g., the roadway, other vehicles, buildings, or other landmarks) mostly in front of the carrier vehicle 110 and the angled video image sensors can capture videos of the environment mostly to the sides of the carrier vehicle 110. As a more specific example, the angled video image sensors can capture videos of adjacent lane(s), vehicle(s) in the adjacent lane(s), a sidewalk environment including people or objects (e.g., fire hydrants or other municipal assets) on the sidewalk, and buildings facades.

At least one of the video image sensors 208 (e.g., the second video image sensor 208B) can be a license plate recognition (LPR) camera having a fixed-focal or varifocal telephoto lens. In some embodiments, the LPR camera can comprise one or more infrared (IR) filters and a plurality of IR light-emitting diodes (LEDs) that allow the LPR camera to operate at night or in low-light conditions. The LPR camera can capture video images at a minimum resolution of 1920×1080 (or 2 MP). The LPR camera can also capture video at a frame rate of between 1 frame per second and 120 FPS. In some embodiments, the LPR camera can also capture video at a frame rate of between 20 FPS and 80 FPS.

The other video image sensors 208 (e.g., the first video image sensor 208A, the third video image sensor 208C, and the fourth video image sensor 208D) can be ultra-low-light HDR image sensors. The HDR image sensors can capture video images at a minimum resolution of 1920×1080 (or 2MP). The HDR image sensors can also capture video at a frame rate of between 1 frame per second and 120 FPS. In certain embodiments, the HDR image sensors can also capture video at a frame rate of between 20 FPS and 80 FPS. In some embodiments, the video image sensors 208 can be or comprise ultra-low-light CMOS image sensors distributed by Sony Semiconductor Solutions Corporation.

FIG. 5C illustrates that the video image sensors 208 housed within the embodiment of the edge device 102 shown in FIG. 5A can have a combined field of view 512 of greater than 180 degrees. For example, the combined field of view 512 can be about 240 degrees. In other embodiments, the combined field of view 512 can be between 180 degrees and 240 degrees.

FIGS. 5D and 5E illustrate perspective and right side views, respectively, of another embodiment of the edge device 102 having a camera skirt 514. The camera skirt 514 can block or filter out light emanating from an interior of the carrier vehicle 110 to prevent the lights from interfering with the video image sensors 208. For example, when the carrier vehicle 110 is a municipal bus, the interior of the municipal bus can be lit by artificial lights (e.g., fluorescent lights, LED lights, etc.) to ensure passenger safety. The camera skirt 514 can block or filter out such excess light to prevent the excess light from degrading the video footage captured by the video image sensors 208.

As shown in FIG. 5D, the camera skirt 514 can comprise a tapered or narrowed end and a wide flared end. The tapered end of the camera skirt 514 can be coupled to a front portion of the device housing 500. The camera skirt 514 can also comprise a skirt distal edge 516 defining the wide flared end. The skirt distal edge 516 can be configured to contact or press against one portion of the windshield or window of the carrier vehicle 110 when the edge device 102 is adhered or otherwise coupled to another portion of the windshield or window via the attachment arm 502.

As shown in FIG. 5D, the skirt distal edge 516 can be substantially elliptical-shaped or stadium-shaped. In other embodiments, the skirt distal edge 516 can be substantially shaped as a rectangle or oval. For example, at least part of the camera skirt 514 can be substantially shaped as a flattened frustoconic or a trapezoidal prism having rounded corners and edges.

FIG. 5D also illustrates that the combined field of view 512 of the video image sensors 208 housed within the embodiment of the edge device 102 shown in FIG. 5D can be less than 180 degrees. For example, the combined field of view 512 can be about 120 degrees or between about 90 degrees and 120 degrees.

Figure 6:
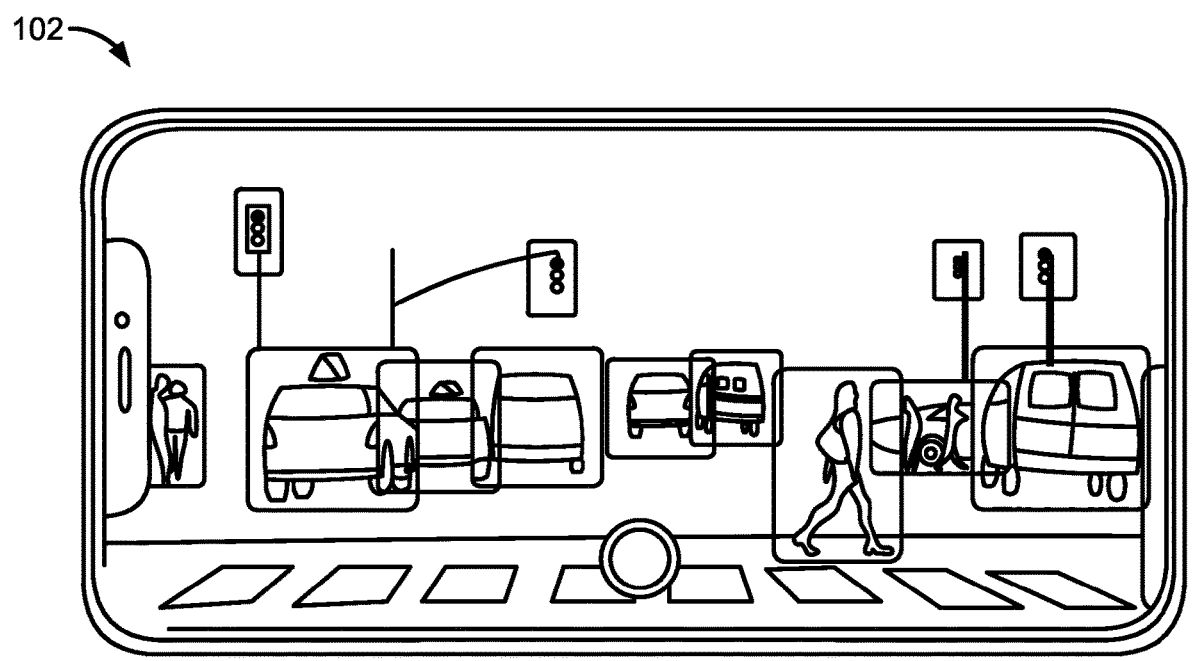
FIG. 6 illustrates another embodiment of an edge device implemented as a personal communication device such as a smartphone.

FIG. 6 illustrates an alternative embodiment of the edge device 102 where the edge device 102 is a personal communication device such as a smartphone or tablet computer. In this embodiment, the video image sensors 208 of the edge device 102 can be the built-in image sensors or cameras of the smartphone or tablet computer. Moreover, references to the one or more processors 200, the wireless communication modules 204, the positioning unit 210, the memory and storage units 202, and the IMUs 206 of the edge device 102 can refer to the same or similar components within the smartphone or tablet computer.

Also, in this embodiment, the smartphone or tablet computer serving as the edge device 102 can also wirelessly communicate or be communicatively coupled to the server 104 via the secure connection 108. The smartphone or tablet computer can also be positioned near a windshield or window of a carrier vehicle 110 via a phone or tablet holder coupled to the windshield, window, dashboard, deck, mount, or body of the carrier vehicle 110.

Figure 7:
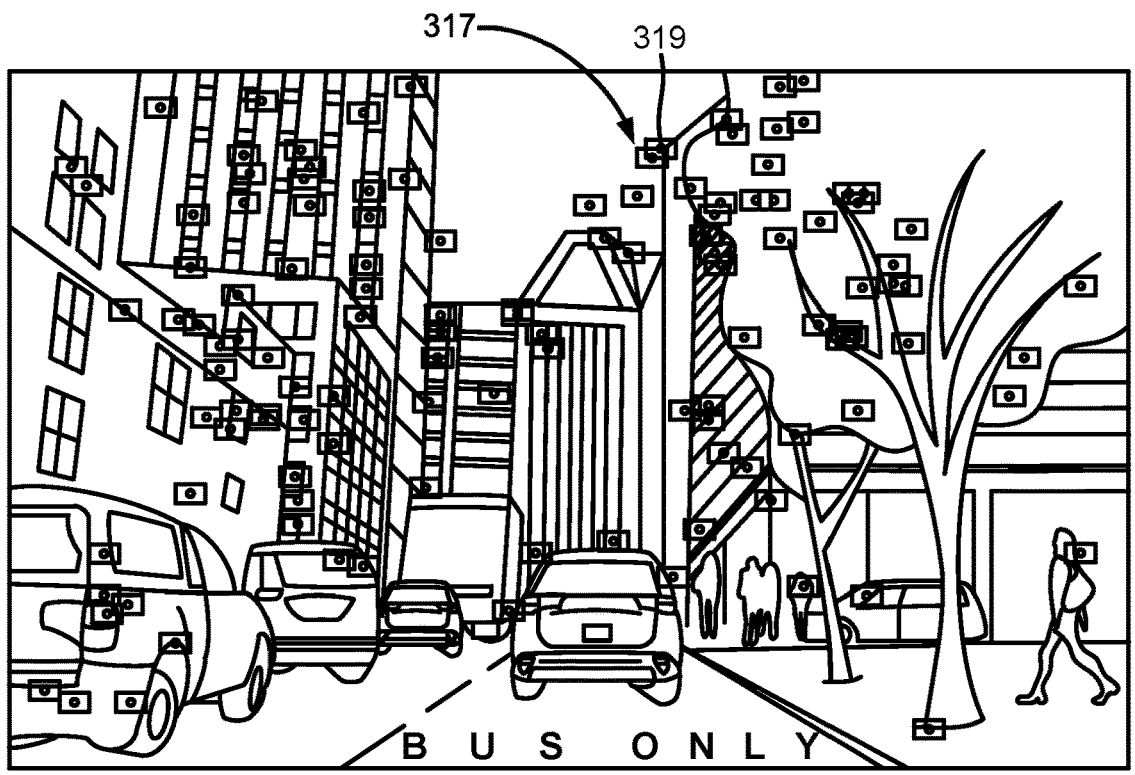
FIG. 7 illustrates point clouds comprising a plurality of salient points being extracted from a video frame of a video captured by the edge device.

FIG. 7 illustrates point clouds 317 comprising a plurality of salient points 319 being extracted from a video frame of a video captured by an edge device 102. In some embodiments, the localization and mapping engine 302 of the edge device 102 (see, e.g., FIG. 3) can call on certain functions from the computer vision library 312 to extract the point clouds 317 and salient points 319 from the videos captured by the video image sensors 208. The salient points 319 can be visually salient features or key points of objects or landmarks shown in the videos. For example, the salient points 319 can be the key features of a building, a vehicle, a tree, a road, a fire hydrant, etc. The point clouds 317 or salient points 319 extracted by the localization and mapping engine 302 can be transmitted from the edge device 102 to the server 104 along with any semantic labels used to identify the objects defined by the point clouds 317 or salient points 319. The point clouds 317 or salient points 319 or can be used by the knowledge engine 306 of the server 104 to construct the 3D semantic annotated maps 318.

Figure 8:
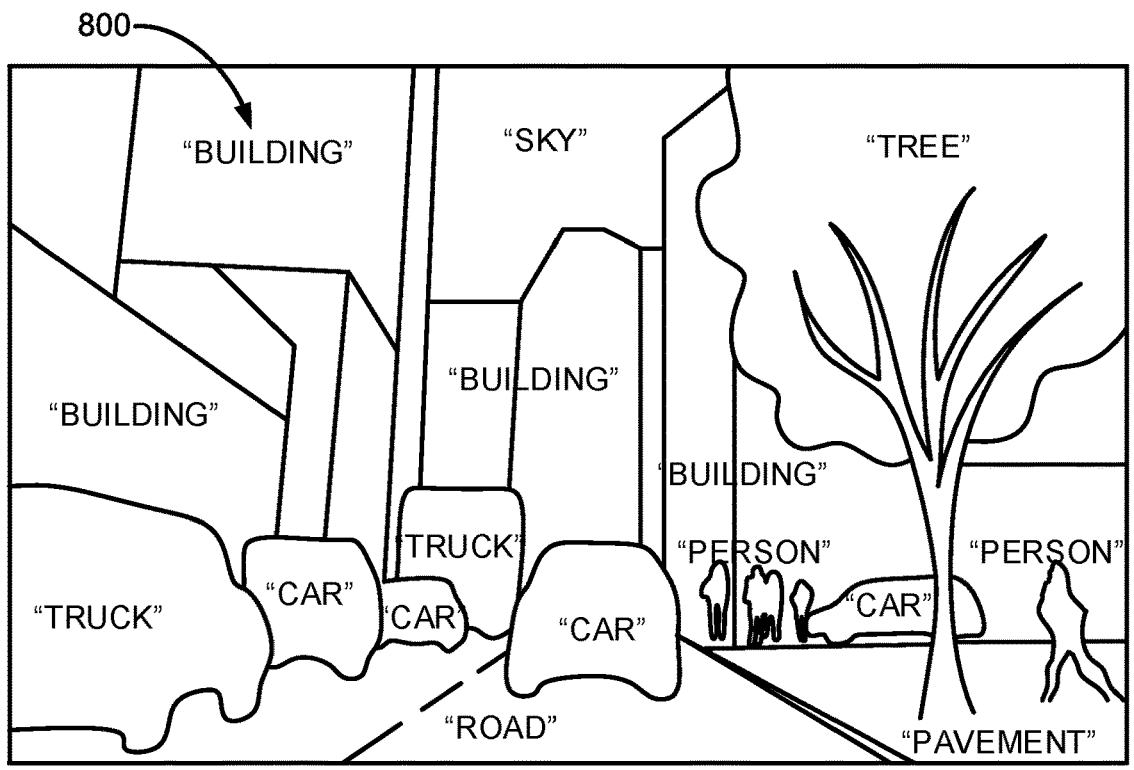
FIG. 8 illustrates a semantically segmented video frame where each pixel of the video frame is associated with a semantic label or class label.

FIG. 8 illustrates that a video frame can be segmented at a pixel-level and each pixel of the video frame can be associated with a semantic label or class label 800. For example, the event detection engine 300 of the edge device 102 can apply one or more functions (e.g., a semantic segmentation function) from the computer vision library 312 to automatically annotate the video frame at a pixel-level with the semantic labels or class labels 800. The semantic labels or class labels 800 can be used by the knowledge engine 306 of the server 104 to construct the 3D semantic annotated maps 318.

FIG. 9 is a visual representation of the vehicle 112 being bound by a vehicular bounding box 900 and a segment of a restricted road area 114 being bound by a road bounding box 902. The event detection engine 300 can pass video frames from the video(s) captured by the video image sensors 208 to the deep learning model 314 running on the edge device 102. Video frames can be processed in real-time by the deep learning model 314. The deep learning model 314 can detect the objects in the video frames and automatically bound the detected objects in bounding boxes. Although FIG. 9 illustrates only the vehicle 112 and the restricted road area 114 being bound by the bounding boxes, it should be understood by one of ordinary skill in the art that each video frame of the video(s) captured by the edge device 102 can comprise a plurality of bounding boxes bounding any number of objects detected within the video frame.

As previously discussed, in one embodiment, the deep learning model 314 can be the YOLO object detection model. As a more specific example, the deep learning model 314 can be the YOLOv3 object detection model. The YOLO object detection model (including the YOLOv3 object detection model) can comprise a plurality of convolutional layers and fully connected layers making up the model's CNN.

The deep learning model 314 can automatically output bounding boxes and class predictions of all objects (e.g., vehicles, roads, pedestrians, etc.) detected in each video frame by feeding the video frames into the CNN. In some embodiments, only one forward pass of the video frame through the CNN is needed to obtain the bounding boxes and class predictions.

The edge device 102 can then determine whether the road area or lane occupied by the vehicle 112 is under any restrictions or prohibitions against occupancy or entry (e.g., a bus lane that only allows buses to be in such lanes during certain hours of the day). For example, the edge device 102 can use positioning data obtained from the positioning unit 210 and the semantic annotated maps 318 to determine whether the road area or lane occupied by the vehicle 112 is under any restrictions or prohibitions against occupancy or entry. For example, the edge device 102 can compare the positioning data against the geolocations of previously identified bus lanes or no parking zones included as part of the stored semantic annotated maps 318. Alternatively, the edge device 102 can determine whether the road occupied by the vehicle 112 is under any restrictions or prohibitions against occupancy or entry by comparing the positioning data against the geolocations of previously identified bus lanes or no parking zones included as part of a government map database (e.g., a government GIS database) accessible by the edge device 102.

As shown in FIG. 9, when the vehicle 112 occupies at least part of the restricted road area 114, the vehicular bounding box 900 can overlap with the road bounding box 902 bounding the restricted road area 114. When the edge device 102 determines that the vehicular bounding box 900 overlaps with the road bounding box 902, the edge device 102 can determine that a potential traffic violation has occurred and begin to compile the evidence package 316 (see, e.g., FIG. 3) to transmit to the server 104.

The edge device 102 can determine that bounding boxes overlap by extracting coordinates and dimensions of the bounding boxes from the deep learning model 314. For example, the one or more processors of the edge device 102 can be programmed to extract the coordinates and dimensions of the vehicular bounding box 900 and the road bounding box 902 and compare such coordinates and dimensions against one another to determine whether there is overlap. Although bounding boxes are shown in FIG. 9, it should be understood by one of ordinary skill in the art that bounding lines, instead of boxes, or both bounding lines and bounding boxes can be used to bound the restricted road area 114.

Moreover, the one or more processors of the edge device 102 can also be programmed to not apply bounding boxes to objects (e.g., vehicles, roads, etc.) if a confidence level or confidence value of such detection is below a predetermined confidence threshold. For example, the confidence threshold can be set at 50%. The confidence level or confidence value of the detection can be provided as an additional output by the deep learning model 314 (see, e.g., FIG. 3) as part of the object detection process.

The one or more processors of the edge device 102 can also be programmed to pass video frames or images captured by the dedicated LPR camera (e.g., the second video image sensor 208B of FIGS. 2A, 5A, and 5D) to the license plate recognition engine 304 of the edge device 102 (see, e.g., FIG. 3).

Alternatively, the one or more processors of the edge device 102 can also be programmed to pass video frames or images captured by one of the HDR image sensors (e.g., the first video image sensor 208A, the third video image sensor 208C, or the fourth video image sensor 208D) to the license plate recognition engine 304 of the edge device 102.

In further embodiments, the license plate recognition engine 304 can be run on the server 104. In additional embodiments, the license plate recognition engine 304 can be run on both the edge device 102 and the server 104.

The license plate recognition engine 304 can comprise a machine learning model specifically trained to recognize license plate numbers from video images. For example, the machine learning model can be a deep learning network or a convolutional neural network specifically trained to recognize license plate numbers from video images. As a more specific example, the machine learning model can be the OpenALPR™ license plate recognition model. The edge device 102 can use the machine learning model to recognize an alphanumeric string 904 representing a recognized license plate number of the vehicle 112.

In some embodiments, the machine learning model can also be configured to recognize a make and model of the vehicle 112 from the video(s) captured by the edge device 102. The edge device 102 can also determine the make and model of the vehicle 112 by querying a third-party or municipal license plate database accessible by the edge device 102 using the alphanumeric string 904 representing the recognized license plate number of the vehicle 112.

Although FIG. 9 illustrates the bounding boxes and license plate number as being visually presented on a display screen, it should be understood by one of ordinary skill in the art that applying and comparing the bounding boxes and extracting alphanumeric strings representing the license plate number can be done without being visualized and with only the outputs of such processes being stored in a database or displayed to a user.

Figure 10:
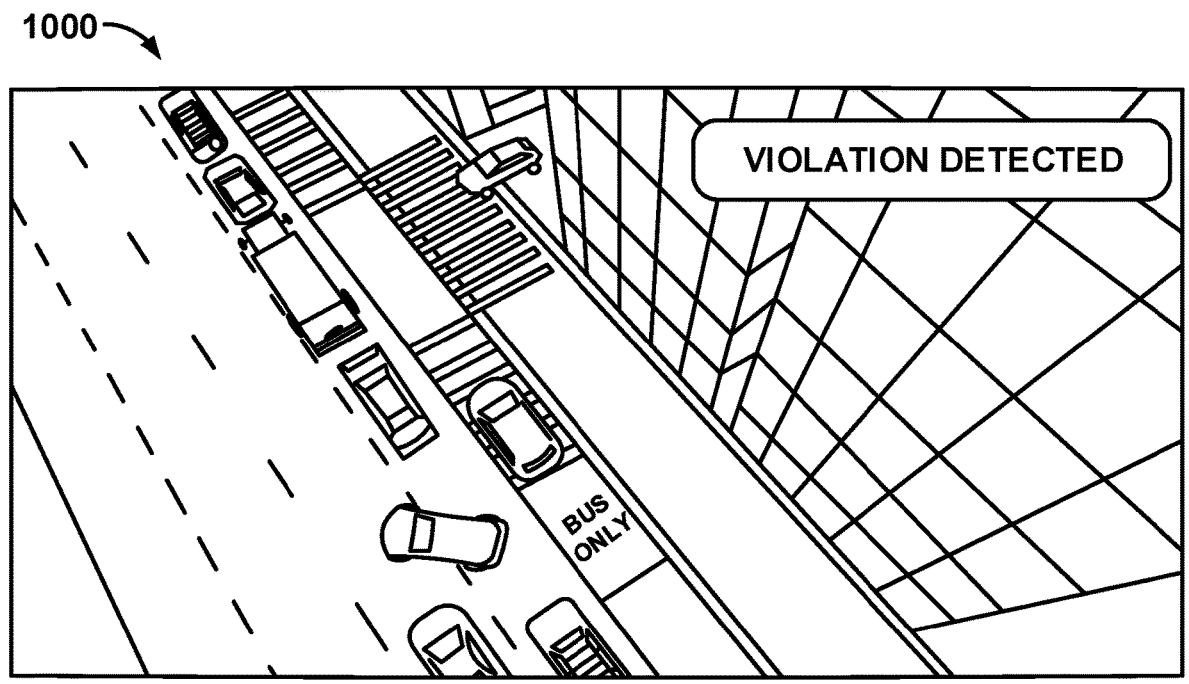
FIG. 10 illustrates one embodiment of a game engine simulation generated by the server.

FIG. 10 illustrates a game engine simulation 1000 generated by the game engine 330 (see, e.g., FIG. 3) of the context reasoning module 326 of the server 104. The game engine simulation 1000 can be a simulation of the potential traffic violation captured by the video image sensors 208 of the edge device 102 involving the vehicle 112 and the restricted road area 114.

For example, the game engine simulation 1000 can be a simulation of a car parked or driving illegally in a bus lane. In this example, the game engine simulation 1000 can include not only the car and the bus lane but also other vehicles or pedestrians in the vicinity of the car and their movements and actions.

The game engine simulation 1000 can be reconstructed from videos (e.g., the first video 120A, the second video 120B, or a combination thereof) and data received from the edge device 102. For example, the game engine simulation 1000 can be constructed from videos and data included as part of the evidence package 316 received from the edge device 102. The game engine 330 can also use semantic labels and data obtained from the semantic annotated maps 318 to construct the game engine simulation 1000.

In some embodiments, the game engine 330 can be a game engine built on the Unreal Engine® creation platform. For example, the game engine 330 can be the CARLA simulation creation platform. In other embodiments, the game engine 330 can be the Godot™ game engine or the Armory™ game engine.

The context reasoning module 326 can use the game engine simulation 1000 to understand a context surrounding the traffic violation. The context reasoning module 326 can apply certain rules to the game engine simulation 1000 to determine if a potential traffic violation is indeed a traffic violation or whether the violation should be mitigated. For example, the context reasoning module 326 can determine a causation of the potential traffic violation based on the game engine simulation 1000. As a more specific example, the context reasoning module 326 can determine that the vehicle 112 stopped only temporarily in the restricted road area 114 to allow an emergency vehicle to pass by. Rules can be set by the context reasoning module 326 to exclude certain detected violations when the game engine simulation 1000 shows that such events violations were caused by one or more mitigating circumstances. In this manner, the game engine simulation 1000 can allow the context reasoning module 326 to determine that certain potential traffic violations should be considered false positives or excused.

In some embodiments, the game engine simulations 1000 can only be used by the server 104 and not displayed to a user of the system 100. In other embodiments, the game engine simulation 1000 can be rendered as a video clip to a user through a web portal or mobile application to allow the user to make a final decision concerning whether the potential traffic violation is indeed a traffic violation.

Figure 11:
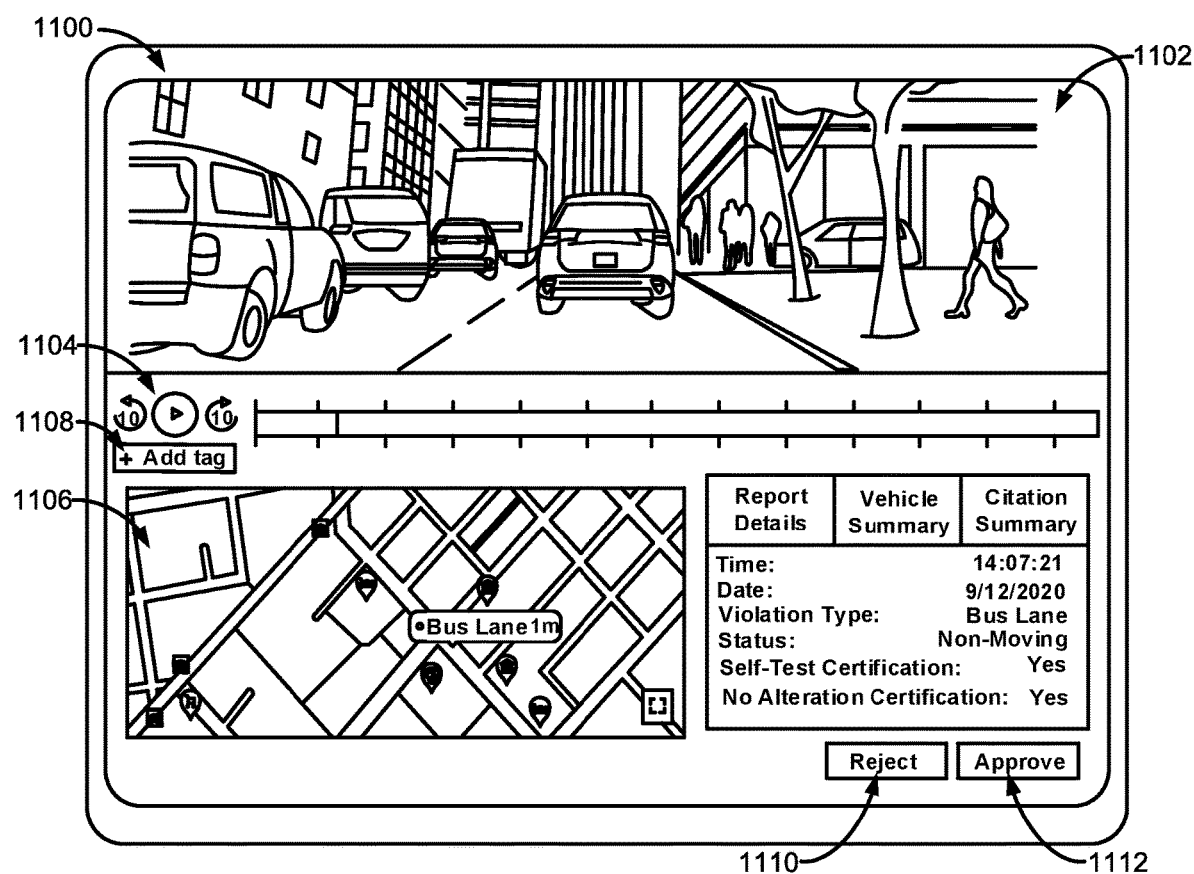
FIG. 11 illustrates one embodiment of a violation review graphical user interface.

FIG. 11 illustrates one example of a violation review GUI 1100. In some embodiments, the violation review GUI 1100 can be accessed through the web or browser-based portal. In other embodiments, the violation review GUI 1100 can be accessed through a downloadable mobile application run on the client device 130 (see, e.g., FIGS. 1A and 3). For example, the mobile application can be an Apple® iOS mobile application or an Android® mobile application.

The violation review GUI 1100 can be one instance of the GUI 334 presented to a user or customer of the system 100 (e.g., a law enforcement official or third-party contractor responsible for adjudicating or otherwise making decisions concerning traffic violations for a municipality or other government entity). For example, the violation review GUI 1100 can comprise a video player 1102 embedded in a portion of the violation review GUI 110 that allows the user to play back one or more evidence videos captured by the edge device(s) 102 concerning the detected traffic violation. The violation review GUI 1100 can also display a number of video control graphic elements 1104 that allow the user to pause, forward, or reverse the video playback, zoom into any video frames of interest, expand the video player to full-screen view, save still images, forward or reverse by single-frames, change the brightness, contrast, or color balance of the video, or a combination thereof.

In some embodiments, a portion or window of the violation review GUI 1100 can provide data or information concerning, among other things, a (i) time and date that the violation occurred, a (ii) violation type (e.g., a bus lane violation), a (iii) violation status (e.g., a moving violation or a non-moving violation), and a (vi) a device or evidence certification status. The violation review GUI 1100 can also provide data or information concerning a location of the violation as determined by one or more of the edge devices 102 (e.g., street name(s) and/or longitude/latitude), a device identifier (e.g., a camera ID number), a carrier vehicle identifier (e.g., a bus ID number), a recognized license plate number, and attributes of the offending vehicle including a color, make/model, or vehicle type of the offending vehicle (e.g., whether the vehicle is a private vehicle or a public vehicle such as a police car, fire truck, ambulance, etc.).

FIG. 11 also illustrates that an additional portion or window of the violation review GUI 1100 can comprise a map 1106 displaying where the violation occurred or is suspected of occurring. In some embodiments, the map 1106 can be manipulated to allow the user to zoom in or out and drag/move the map.

The violation review GUI 1100 can also allow the user to add one or more tags to categorize or classify the violation under review. For example, the violation review GUI 1100 can allow the user to add the one or more tags by applying one or more user inputs to a tagging graphic element 1108. Once the user applies a user input to the tagging graphic element 1108, the user can select from a list of predefined tags to tag the traffic violation. In other embodiments, the user can create a new tag by typing into a text input element.

The violation review GUI 1100 can also provide the user the ability reject or approve the detected traffic violation by applying one or more user inputs to a reject graphic element 1110 and an approve graphic element 1112 displayed through the violation review GUI 1100. For example, the user can apply a user input (e.g., a click or touch input) to the reject graphic element 1110 when data or information concerning the detected traffic violation (e.g., the license plate, the color, or the make/model of the offending vehicle) do not match up with the video evidence shown in the video player 1102. Moreover, a user can apply a user input to the reject graphic element 1110 when the user observes a mitigating circumstance from the video playback not detected by the reasoning engine 308 or not included as part of the game engine simulation 1000.

The user can also apply a user input to the approve graphic element 1112 when the user is satisfied that the traffic violation has occurred based on a review of the video evidence and the data/information provided through the violation review GUI 1100.

A number of embodiments have been described. Nevertheless, it will be understood by one of ordinary skill in the art that various changes and modifications can be made to this disclosure without departing from the spirit and scope of the embodiments. Elements of systems, devices, apparatus, and methods shown with any embodiment are exemplary for the specific embodiment and can be used in combination or otherwise on other embodiments within this disclosure. For example, the steps of any methods depicted in the figures or described in this disclosure do not require the particular order or sequential order shown or described to achieve the desired results. In addition, other steps operations may be provided, or steps or operations may be eliminated or omitted from the described methods or processes to achieve the desired results. Moreover, any components or parts of any apparatus or systems described in this disclosure or depicted in the figures may be removed, eliminated, or omitted to achieve the desired results. In addition, certain components or parts of the systems, devices, or apparatus shown or described herein have been omitted for the sake of succinctness and clarity.

Accordingly, other embodiments are within the scope of the following claims and the specification and/or drawings may be regarded in an illustrative rather than a restrictive sense.

Each of the individual variations or embodiments described and illustrated herein has discrete components and features which may be readily separated from or combined with the features of any of the other variations or embodiments. Modifications may be made to adapt a particular situation, material, composition of matter, process, process act(s) or step(s) to the objective(s), spirit or scope of the present invention.

Methods recited herein may be carried out in any order of the recited events that is logically possible, as well as the recited order of events. Moreover, additional steps or operations may be provided or steps or operations may be eliminated to achieve the desired result.

Furthermore, where a range of values is provided, every intervening value between the upper and lower limit of that range and any other stated or intervening value in that stated range is encompassed within the invention. Also, any optional feature of the inventive variations described may be set forth and claimed independently, or in combination with any one or more of the features described herein. For example, a description of a range from 1 to 5 should be considered to have disclosed subranges such as from 1 to 3, from 1 to 4, from 2 to 4, from 2 to 5, from 3 to 5, etc. as well as individual numbers within that range, for example 1.5, 2.5, etc. and any whole or partial increments therebetween.

All existing subject matter mentioned herein (e.g., publications, patents, patent applications) is incorporated by reference herein in its entirety except insofar as the subject matter may conflict with that of the present invention (in which case what is present herein shall prevail). The referenced items are provided solely for their disclosure prior to the filing date of the present application. Nothing herein is to be construed as an admission that the present invention is not entitled to antedate such material by virtue of prior invention.

Reference to a singular item, includes the possibility that there are plural of the same items present. More specifically, as used herein and in the appended claims, the singular forms "a," "an," "said" and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Unless defined otherwise, all technical and scientific terms used herein have the same meaning as commonly understood by one of ordinary skill in the art to which this invention belongs.

Reference to the phrase "at least one of", when such phrase modifies a plurality of items or components (or an enumerated list of items or components) means any combination of one or more of those items or components. For example, the phrase "at least one of A, B, and C" means: (i) A; (ii) B; (iii) C; (iv) A, B, and C; (v) A and B; (vi) B and C; or (vii) A and C.

In understanding the scope of the present disclosure, the term "comprising" and its derivatives, as used herein, are intended to be open-ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" "element," or "component" when used in the singular can have the dual meaning of a single part or a plurality of parts. As used herein, the following directional terms "forward, rearward, above, downward, vertical, horizontal, below, transverse, laterally, and vertically" as well as any other similar directional terms refer to those positions of a device or piece of equipment or those directions of the device or piece of equipment being translated or moved.

Finally, terms of degree such as "substantially", "about" and "approximately" as used herein mean the specified value or the specified value and a reasonable amount of deviation from the specified value (e.g., a deviation of up to ±0.1%, ±1%, ±5%, or ±10%, as such variations are appropriate) such that the end result is not significantly or materially changed. For example, "about 1.0 cm" can be interpreted to mean "1.0 cm" or between "0.9 cm and 1.1 cm." When terms of degree such as "about" or "approximately" are used to refer to numbers or values that are part of a range, the term can be used to modify both the minimum and maximum numbers or values.

The term "engine" or "module" as used herein can refer to software, firmware, hardware, or a combination thereof. In the case of a software implementation, for instance, these may represent program code that performs specified tasks when executed on a processor (e.g., CPU, GPU, or processor cores therein). The program code can be stored in one or more computer-readable memory or storage devices. Any references to a function, task, or operation performed by an "engine" or "module" can also refer to one or more processors of a device or server programmed to execute such program code to perform the function, task, or operation.

It will be understood by one of ordinary skill in the art that the various methods disclosed herein may be embodied in a non-transitory readable medium, machine-readable medium, and/or a machine accessible medium comprising instructions compatible, readable, and/or executable by a processor or server processor of a machine, device, or computing device. The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

This disclosure is not intended to be limited to the scope of the particular forms set forth, but is intended to cover alternatives, modifications, and equivalents of the variations or embodiments described herein. Further, the scope of the disclosure fully encompasses other variations or embodiments that may become obvious to those skilled in the art in view of this disclosure.

We claim:

1. A method for detecting a traffic violation, comprising:

capturing a first video of a vehicle and a restricted road area using one or more video image sensors of a first edge device, wherein the first video comprises a first frame captured at a first point in time;

determining a location of the vehicle using in part a first positioning data obtained from a first positioning unit of the first edge device;

identifying, using one or more processors of the first edge device, the vehicle, the restricted road area, a first set of vehicle attributes of the vehicle, and a first alphanumeric string representing a license plate number of the vehicle from frames of the first video by applying a plurality of functions from a computer vision library to the first video and passing at least some the frames of the first video including the first frame to a deep learning model running on the first edge device;

bounding, using the one or more processors of the first edge device, the vehicle and the restricted road area in the first frame in a plurality of first bounding boxes;

detecting, at the first edge device, a first potential traffic violation at the first point in time based in part on overlap of the plurality of first bounding boxes and transmitting at least the first alphanumeric string, the first set of vehicle attributes, and the first positioning data from the first edge device to the server;

capturing a second video of the vehicle and the restricted road area using one or more video image sensors of a second edge device, wherein the second video comprises a second frame captured at a second point in time after the first point in time;

identifying, using one or more processors of the second edge device, the vehicle, the restricted road area, a second set of vehicle attributes of the vehicle, and a second alphanumeric string representing the license plate number of the vehicle from frames of the second video by applying a plurality of functions from a computer vision library to the second video and passing at least some of the frames of the second video including the second frame to a deep learning model running on the second edge device;

bounding, using the one or more processors of the second edge device, the vehicle and the restricted road area in the second frame in a plurality of second bounding boxes;

detecting, at the second edge device, a second potential traffic violation at the second point in time based in part on overlap of the plurality of second bounding boxes and transmitting at least the second alphanumeric string, the second set of vehicle attributes, and a second positioning data obtained from a second positioning unit of the second edge device from the second edge device to the server; and determining, at the server, that a traffic violation has occurred based on an elapsed time between the second point in time and the first point in time and based on a comparison of the first alphanumeric string with the second alphanumeric string, the first set of vehicle attributes with the second set of vehicle attributes, and the first positioning data with the second positioning data.

2. The method of claim 1, wherein the deep learning model comprises a convolutional neural network trained for object detection, and wherein the deep learning model is trained in part from videos captured using edge devices other than the first edge device and the second edge device.

3. The method of claim 1, wherein the first positioning unit is a multi-band global navigation satellite system (GNSS) receiver configured for concurrent reception of signals from at least two of a GPS satellite navigation system, a GLONASS satellite navigation system, a Galileo navigation system, and a BeiDou satellite navigation system.

4. The method of claim 1, wherein the step of bounding the vehicle and the restricted road area further comprises bounding the vehicle using a vehicular bounding box and bounding the restricted road area using a road bounding box, and wherein the step of determining the first potential traffic violation further comprises detecting an overlap of the vehicular bounding box with the road bounding box.

5. The method of claim 1, wherein at least one of the video image sensors of the first edge device is a license plate recognition (LPR) camera, wherein the method further comprises passing a video frame captured by the LPR camera to a license plate recognition engine model running on the first edge device to identify the first alphanumeric string representing the license plate number of the vehicle.

6. The method of claim 1, where the step of capturing the first video further comprises capturing the first video at a frame rate of between 1 frame per second and 120 frames per second (FPS), and wherein at least some of the video image sensors of the first edge device are high-dynamic range (HDR) image sensors.

7. The method of claim 1, wherein the first edge device is configured to be coupled to a first carrier vehicle, wherein the first edge device comprises a first vehicle bus connector for obtaining wheel odometry data from a wheel odometer of the first carrier vehicle, and wherein the step of determining the location of the vehicle further comprises using in part the wheel odometry data from the first carrier vehicle.

8. The method of claim 1, further comprising generating, using the one or more server processors, a simulation of the traffic violation using a reasoning engine running on the server by utilizing a game engine based on data and video frames obtained from at least one of the first video and the second video.

9. The method of claim 1, further comprising generating, using the one or more server processors, a graphical user interface (GUI) to be displayed on a client device communicatively coupled to the server, wherein the GUI comprises a video clip made from at least one of the first video and the second video, the location of the vehicle determined by at least one of the first edge device and the second edge device, and a portion of a map showing the location.

10. The method of claim 1, wherein the first edge device comprises an attachment arm configured to secure the first edge device to at least one of a window, a dashboard, a deck, a mount, a rail, a handlebar, and a body of a carrier vehicle.

11. A system for detecting a traffic violation, comprising:
a first edge device comprising one or more first edge device processors, one or more first video image sensors, and a first positioning unit,
wherein the first video image sensors are configured to capture a first video of a vehicle and a restricted road area, wherein the first video comprises a first frame captured at a first point in time;
wherein the one or more first edge device processors are programmed to:
determine a location of the vehicle using in part a first positioning data obtained from the first positioning unit;
identify the vehicle, the restricted road area, a first set of vehicle attributes of the vehicle, and a first alphanumeric string representing a license plate number of the vehicle from frames of the first video by applying a plurality of functions from a computer vision library to the first video and passing at least some of the first video including the first frame to a deep learning model running on the first edge device;
bound the vehicle and the restricted road area in the first frame in a plurality of first bounding boxes;
detect a first potential traffic violation at the first point in time based in part on overlap of the plurality of first bounding boxes and transmit at least the first alphanumeric string, the first set of vehicle attributes, and the first positioning data from the first edge device to a server;
a second edge device comprising one or more second edge device processors, one or more second video image sensors, and a second positioning unit,
wherein the second video image sensors are configured to capture a second video of the vehicle and the restricted road area, wherein the second video comprises a second frame captured at a second point in time after the first point in time;
wherein the one or more second edge device processors are programmed to:
determine the location of the vehicle using in part a second positioning data obtained from the second positioning unit;
identify the vehicle, the restricted road area, a second set of vehicle attributes of the vehicle, and a second alphanumeric string representing the license plate number of the vehicle from frames of the second video by applying a plurality of functions from the computer vision library to the second video and passing at least some of the second video including the second frame to the deep learning model running on the second edge device;
bound the vehicle and the restricted road area in the second frame in a plurality of second bounding boxes;
detect a second potential traffic violation at the second point in time based in part on overlap of the plurality of second bounding boxes and transmit at least the second alphanumeric string, the second set of vehicle attributes, and the second positioning data from the second edge device to the server; and
wherein the server comprises one or more server processors programmed to determine that a traffic violation has occurred based on an elapsed time between the second point in time and the first point in time and based on a comparison of the first alphanumeric string with the second alphanumeric string, the first set of vehicle attributes with the second set of vehicle attributes, and the first positioning data with the second positioning data.

12. The system of claim 11, wherein the deep learning model comprises a convolutional neural network trained for object detection, and wherein the deep learning model is trained in part from videos captured using edge devices other than the first edge device and the second edge device.

13. The system of claim 11, wherein the first positioning unit and the second positioning unit are multi-band global navigation satellite system (GNSS) receivers configured for concurrent reception of signals from at least two of a GPS satellite navigation system, a GLONASS satellite navigation system, a Galileo navigation system, and a BeiDou satellite navigation system.

14. The system of claim 11, wherein the one or more first edge device processors are further programmed to:
bound the vehicle in the first frame using a vehicular bounding box;
bound the restricted road area in the first frame using a road bounding box; and
detect the first potential traffic violation by detecting an overlap of the vehicular bounding box with the road bounding box.

15. The system of claim 11, wherein at least one of the video image sensors of the first edge device is a license plate recognition (LPR) camera, wherein a video frame captured by the LPR camera is passed to a license plate recognition engine running on the first edge device to identify the first alphanumeric string representing the license plate number of the vehicle.

16. The system of claim 11, wherein the first video is captured at a frame rate of between 1 frame per second and 120 frames per second (FPS), and wherein at least some of the video image sensors of the first edge device are high-dynamic range (HDR) image sensors.

17. The system of claim 11, wherein the first edge device is configured to be coupled to a first carrier vehicle, wherein the first edge device comprises a first vehicle bus connector for obtaining wheel odometry data from a wheel odometer of the first carrier vehicle, and wherein the location of the vehicle is determined in part from the wheel odometry data.

18. The system of claim 11, wherein the server comprises a reasoning engine running on the server, wherein the reasoning engine generates a simulation of the traffic violation utilizing a game engine based on data and video frames obtained from the first video and the second video.

19. The system of claim 11, wherein the one or more server processors are further programmed to generate a graphical user interface (GUI) to be displayed on a client device communicatively coupled to the server, wherein the GUI comprises a video clip made from at least one of the first video and the second video, the location of the vehicle determined by at least one of the first edge device and the second edge device, and a portion of a map showing the location.

20. A device for detecting a potential traffic violation, comprising:
one or more video image sensors configured to capture a video of a vehicle and a restricted road area;
a global navigation satellite system (GNSS) receiver configured to determine a location of the vehicle; and
one or more processors programmed to executed instructions to:
identify the vehicle and the restricted road area from frames of the video by applying a plurality of functions from a computer vision library to the frames and passing the frames to a deep learning model running on the device;
bound the vehicle in the frames with a vehicular bounding box and bound the restricted road area in the frames with a road bounding box; and
detect that a potential traffic violation has occurred based in part on the location of the vehicle and overlap of the vehicular bounding box with the road bounding box.

21. The method of claim 1, wherein the first video is captured using the one or more video image sensors of the first edge device when the first edge device is coupled to a first carrier vehicle while the first carrier vehicle is in motion, and wherein the second video is captured using the one or more video image sensors of the second edge device when the second edge device is coupled to a second carrier vehicle while the second carrier vehicle is in motion.

22. The method of claim 1, wherein the restricted road area is a restricted lane of a roadway.

23. The method of claim 1, wherein bounding the vehicle and the restricted road area in the first frame in the plurality of first bounding boxes further comprises passing at least the first frame to the deep learning model running on the first edge device to bound the vehicle and the restricted road area in the plurality of first bounding boxes, and wherein bounding the vehicle and the restricted road area in the second frame in the plurality of second bounding boxes further comprises passing at least the second frame to the deep learning model running on the second edge device to bound the vehicle and the restricted road area in the plurality of second bounding boxes.

24. The method of claim 1, further comprising:
determining, using the first edge device, a road area as the restricted road area using the first positioning data obtained from the first positioning unit and using data or information from a semantic annotated map stored on the first edge device; and
determining, using the second edge device, the road area as the restricted road area using the second positioning data obtained from the second positioning unit and using data or information from a semantic annotated map stored on the second edge device.

25. The system of claim 11, wherein the first video is captured using the one or more video image sensors of the first edge device when the first edge device is coupled to a first carrier vehicle while the first carrier vehicle is in motion, and wherein the second video is captured using the one or more video image sensors of the second edge device when the second edge device is coupled to a second carrier vehicle while the second carrier vehicle is in motion.

26. The system of claim 11, wherein the restricted road area is a restricted lane of a roadway.

27. The system of claim 11, wherein the one or more first edge device processors are further programmed to bound the vehicle and the restricted road area in the first frame in the plurality of first bounding boxes by passing at least the first frame to the deep learning model running on the first edge device to bound the vehicle and the restricted road area in the plurality of first bounding boxes, and wherein the one or more second edge device processors are further programmed to bound the vehicle and the restricted road area in the second frame in the plurality of second bounding boxes by passing at least the second frame to the deep learning model running on the second edge device to bound the vehicle and the restricted road area in the plurality of second bounding boxes.

28. The system of claim 11, wherein the one or more first edge device processors are further programmed to determine a road area as the restricted road area using the first positioning data obtained from the first positioning unit and using data or information from a semantic annotated map stored on the first edge device; and wherein the one or more second edge device processors are further programmed to determine a road area as the restricted road area using the second positioning data obtained from the second positioning unit and using data or information from a semantic annotated map stored on the second edge device.

29. The device of claim 20, wherein the video is captured using the one or more video image sensors of the edge device when the edge device is coupled to a carrier vehicle while the carrier vehicle is in motion.

30. The device of claim 20, wherein the restricted road area is a restricted lane of a roadway.

31. The device of claim 20, wherein the one or more processors are further programmed to pass the frames of the video to the deep learning model to bound the vehicle in the frames with the vehicular bounding box and bound the restricted road area in the frames with the road bounding box.

32. The device of claim 20, wherein the one or more processors are further programmed to determine a road area as the restricted road area using the location of the vehicle and using data or information from a semantic annotated map stored on the edge device.

* * * * *